United States Patent
Blume et al.

(10) Patent No.: US 9,598,562 B2
(45) Date of Patent: Mar. 21, 2017

(54) MERCAPTOSILANE-CARBON BLACK BLEND

(71) Applicants: Anke Blume, Weilerswist (DE); Oliver Klockmann, Niederzier (DE)

(72) Inventors: Anke Blume, Weilerswist (DE); Oliver Klockmann, Niederzier (DE)

(73) Assignee: EVONIK DEGUSSA GMBH, Essen (DE)

( * ) Notice: Subject to any disclaimer, the term of this patent is extended or adjusted under 35 U.S.C. 154(b) by 198 days.

(21) Appl. No.: 14/390,770

(22) PCT Filed: Mar. 11, 2013

(86) PCT No.: PCT/EP2013/054847
§ 371 (c)(1),
(2) Date: Oct. 3, 2014

(87) PCT Pub. No.: WO2013/149790
PCT Pub. Date: Oct. 10, 2013

(65) Prior Publication Data
US 2015/0175782 A1 Jun. 25, 2015

(30) Foreign Application Priority Data
Apr. 5, 2012 (DE) .......... 10 2012 205 642

(51) Int. Cl.
| C08L 9/06 | (2006.01) |
| C09C 1/48 | (2006.01) |
| C08K 9/06 | (2006.01) |
| C09C 3/12 | (2006.01) |
| C08K 3/04 | (2006.01) |
| C08K 13/00 | (2006.01) |
| C08K 5/548 | (2006.01) |

(52) U.S. Cl.
CPC ........ *C08L 9/06* (2013.01); *C08K 3/04* (2013.01); *C08K 5/548* (2013.01); *C08K 9/06* (2013.01); *C08K 13/00* (2013.01); *C09C 1/48* (2013.01); *C09C 3/12* (2013.01); *C08L 2205/02* (2013.01)

(58) Field of Classification Search
None
See application file for complete search history.

(56) References Cited

U.S. PATENT DOCUMENTS

| 6,849,754 | B2 * | 2/2005 | Deschler ............... C07F 7/1836 556/427 |
| 7,323,582 | B2 | 1/2008 | Deschler et al. |
| 8,013,178 | B2 | 9/2011 | Klockmann et al. |
| 2003/0229166 | A1 | 12/2003 | Krafczyk et al. |
| 2008/0319128 | A1 * | 12/2008 | Korth .................... C07F 7/1892 524/588 |
| 2011/0217229 | A1 * | 9/2011 | Inomata ................ C09C 1/48 423/449.1 |
| 2012/0270974 | A1 | 10/2012 | Steinhauser et al. |
| 2014/0206809 | A1 * | 7/2014 | Miyazaki ............... C08L 7/00 524/432 |

FOREIGN PATENT DOCUMENTS

| DE | 102009023915 A1 | 12/2010 |
| EP | 1285926 A1 | 2/2003 |
| EP | 1367059 A2 | 12/2003 |
| EP | 1683801 A2 | 7/2006 |
| JP | 62-181346 * | 8/1987 |
| KR | 850000081 B1 | 2/1985 |

OTHER PUBLICATIONS

Notification of Transmittal of International Preliminary Report on Patentability (Forms PCT/IB/326, 373, and 237) , for Application No. PCT/EP2013/054847 dated Oct. 7,2014.
Notification of Transmittal of International Preliminary Report on Patentability (Forms PCT/IB/338, 373 and 237), for Application No. PCT/EP2013/054847 dated Oct. 7, 2014.

* cited by examiner

*Primary Examiner* — Marc Zimmer
(74) *Attorney, Agent, or Firm* — Smith, Gambrell & Russell, LLP

(57) ABSTRACT

The invention provides mercaptosilane-carbon black blends comprising at least 20 wt. % of mercaptosilanes of the general formula I

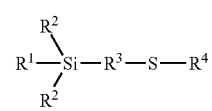

and carbon black, the mercaptosilane-carbon black blend having an iron content of <9 ppm.
They are produced by mixing the mercaptosilanes of the general formula I with the carbon black.
They can be used in rubber mixtures.

8 Claims, No Drawings

MERCAPTOSILANE-CARBON BLACK BLEND

The invention relates to a mercaptosilane-carbon black blend, method for producing same, and use thereof.

EP 1285926 and EP 1683801 disclose mercaptosilanes having polyether groups.

Additionally, KR 850000081 discloses silane/filler blends.

A disadvantage of the known mercaptosilane/filler blends is the poor shelf life.

It is an object of the present invention to provide blends of mercaptosilanes with carbon black that enjoy an improved shelf life.

The invention provides a mercaptosilane-carbon black blend comprising at least 20 wt. %, preferably at least 25 wt. %, more preferably at least 30 wt. %, of mercaptosilane of the general formula I

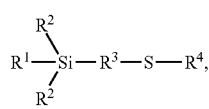

based on the mercaptosilane-carbon black blend, wherein $R^1$ is an alkyl polyether group $-O-(R^6-O)_m-R^6$, with $R^5$ being identical or different at each occurrence and being a branched or unbranched, saturated or unsaturated, aliphatic divalent C1-C30 hydrocarbon group, preferably $CH_2-CH_2$, $CH_2-CH(CH_3)$, $-CH(CH_3)-CH_2-$ or $CH_2-CH_2-CH_2$, m being on average 1 to 30, preferably 2 to 20, more preferably 2 to 15, very preferably 3 to 10, exceptionally preferably 3.5 to 7.9, and $R^6$ consisting of at least 1, preferably at least 11, more preferably at least 12, C atoms and being an unsubstituted or substituted, branched or unbranched monovalent alkyl, alkenyl, aryl or aralkyl group, $R^2$ is identical or different at each occurrence and is an $R^1$, C1-C12 alkyl or $R^7O$ group, with $R^7$ being H, methyl, ethyl, propyl, C9-C30 branched or unbranched monovalent alkyl, alkenyl, aryl or aralkyl group or $(R^8)_3Si$ group, with $R^8$ being C1-C30 branched or unbranched alkyl or alkenyl group, $R^3$ is a branched or unbranched, saturated or unsaturated, aliphatic, aromatic or mixed aliphatic/aromatic divalent C1-C30, preferably C1-C6, more preferably C3, hydrocarbon group, and $R^4$ is H, CN or $(C=O)-R^9$, with $R^9$ being a branched or unbranched, saturated or unsaturated, aliphatic, aromatic or mixed aliphatic/aromatic monovalent C1-C30, preferably C5 to C30, more preferably C5 to C20, very preferably C7 to C15, exceptionally preferably C7 to C11, hydrocarbon group, and carbon black, which is characterized in that the mercaptosilane-carbon black blend has an iron content <9 ppm, very preferably of 0.1-6 ppm.

The mercaptosilane-carbon black blend may comprise a mixture of different mercaptosilanes of the general formula I and/or their condensation products.

The carbon black in the mercaptosilane-carbon black blend may have a sieve residue ≤50 ppm, preferably <40 ppm, more preferably <35 ppm.

The mercaptosilanes of the general formula I may be compounds wherein $R^1$ is an alkyl polyether group $-O-(R^6-O)_m-R^6$, with $R^5$, identical or different at each occurrence, being a branched or unbranched, saturated or unsaturated, aliphatic divalent C1-C30 hydrocarbon group, m being on average 1 to 30, and $R^6$ consisting of at least 11 C atoms and being an unsubstituted or substituted, branched or unbranched monovalent alkyl, alkenyl, aryl or aralkyl group, $R^2$ is identical at each occurrence and is a C1-C12 alkyl or $R^7O$ group, with $R^7$ being H, ethyl, propyl, C9-C30 branched or unbranched monovalent alkyl, alkenyl, aryl or aralkyl group or $(R^8)_3Si$ group, with $R^8$ being C1-C30 branched or unbranched alkyl or alkenyl group, $R^3$ is a branched or unbranched, saturated or unsaturated, aliphatic, aromatic or mixed, aliphatic/aromatic divalent C1-C30 hydrocarbon group, and $R^4$ is H, CN or $(C=O)-R^9$, with $R^9$ being a branched, unbranched, saturated or unsaturated, aliphatic, aromatic or mixed aliphatic/aromatic monovalent C1-C30 hydrocarbon group.

The mercaptosilanes of the general formula I may be compounds wherein $R^1$ is $-O-(C_2H_4-O)_5-C_{11}H_{23}$, $-O-(C_2H_4-O)_5-C_{12}H_{25}$, $-O-(C_2H_4-O)_5-C_{13}H_{27}$, $-O-(C_2H_4-O)_5-C_{14}H_{29}$, $-O-(C_2H_4-O)_5-C_{15}H_{31}$, $-O-(C_2H_4-O)_3-C_{13}H_{27}$, $-O-(C_2H_4-O)_4-C_{13}H_{27}$, $-O-(C_2H_4-O)_6-C_{13}H_{27}$, $-O-(C_2H_4-O)_7-C_{13}H_{27}$, $-O-(CH_2CH_2-O)_5-(CH_2)_{10}CH_3$, $-O-(CH_2CH_2-O)_5-(CH_2)_{11}CH_3$, $-O-(CH_2CH_2-O)_5-(CH_2)_{12}CH_3$, $-O-(CH_2CH_2-O)_5-(CH_2)_{13}CH_3$, $-O-(CH_2CH_2-O)_5-(CH_2)_{14}CH_3$, $-O-(CH_2CH_2-O)_3-(CH_2)_{12}CH_3$, $-O-(CH_2CH_2-O)_4-(CH_2)_{12}CH_3$, $-O-(CH_2CH_2-O)_6-(CH_2)_{12}CH_3$, $-O-(CH_2CH_2-O)_7-(CH_2)_{12}CH_3$,

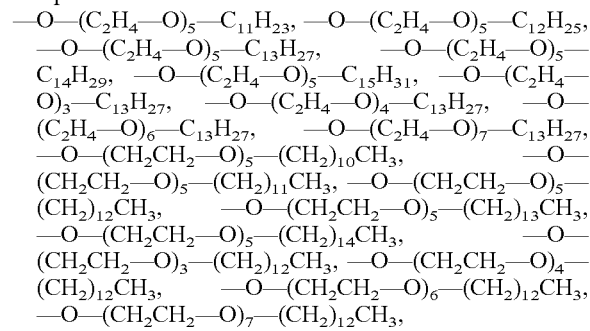

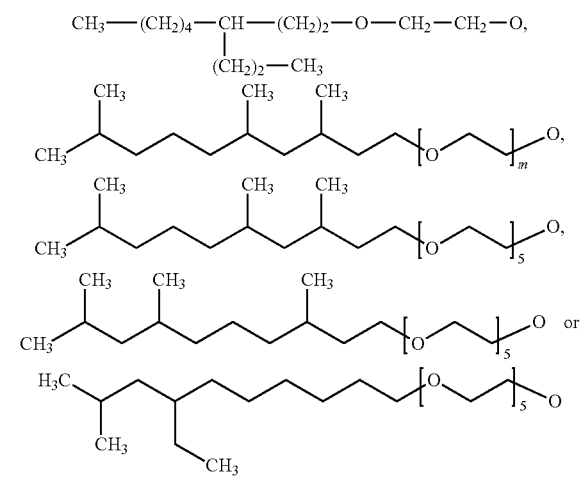

$R^2$ is different and is an $R^1-$, C1-C12 alkyl or $R^7O$ group, with $R^7$ being H, methyl, ethyl, propyl, C9-C30 branched or unbranched monovalent alkyl, alkenyl, aryl or aralkyl group or $(R^8)_3Si$ group, with $R^8$ being C1-C30 branched or unbranched alkyl or alkenyl group, $R^3$ is a branched or unbranched, saturated, or unsaturated, aliphatic, aromatic or mixed aliphatic/aromatic divalent C1-C30 hydrocarbon group, and $R^4$ is H, CN or $(C=O)-R^9$, with $R^9$ being a branched or unbranched, saturated or unsaturated, aliphatic, aromatic or mixed aliphatic/aromatic monovalent C1-C30 hydrocarbon group.

The mercaptosilanes of the general formula I may be compounds wherein $R^1$ is

—O—(C₂H₄—O)₅—C₁₁H₂₃, —O—(C₂H₄—O)₅—C₁₂H₂₅, —O—(C₂H₄—O)₅—C₁₃H₂₇, —O—(C₂H₄—O)₅—C₁₄H₂₉, —O—(C₂H₄—O)₅—C₁₅H₃₁, —O—(C₂H₄—O)₃—C₁₃H₂₇, —O—(C₂H₄—O)₄—C₁₃H₂₇, —O—(C₂H₄—O)₆—C₁₃H₂₇, —O—(C₂H₄—O)₇—C₁₃H₂₇, —O—(CH₂CH₂—O)₅—(CH₂)₁₀CH₃, —O—(CH₂CH₂—O)₅—(CH₂)₁₁CH₃, —O—(CH₂CH₂—O)₅—(CH₂)₁₂CH₃, —O—(CH₂CH₂—O)₅—(CH₂)₁₃CH₃, —O—(CH₂CH₂—O)₅—(CH₂)₁₄CH₃, —O—(CH₂CH₂—O)₃—(CH₂)₁₂CH₃, —O—(CH₂CH₂—O)₄—(CH₂)₁₂CH₃, —O—(CH₂CH₂—O)₆—(CH₂)₁₂CH₃, —O—(CH₂CH₂—O)₇—(CH₂)₁₂CH₃,

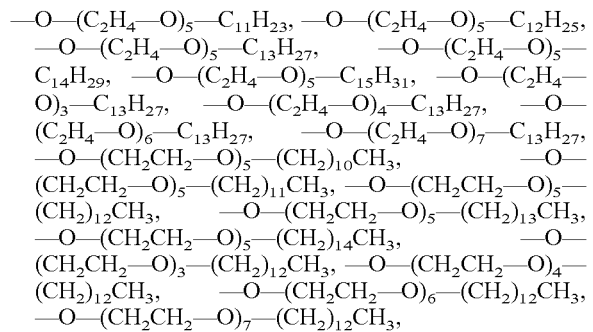

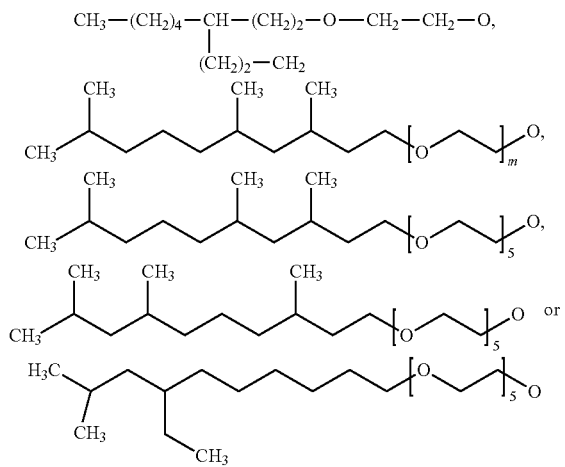

$R^2$ is $R^1$ group, $R^3$ is a branched or unbranched, saturated or unsaturated, aliphatic, aromatic or mixed aliphatic/aromatic divalent C1-C30 hydrocarbon group, and $R^4$ is H, CN or (C=O)—$R^9$, with $R^9$ being a branched, unbranched, saturated or unsaturated, aliphatic, aromatic or mixed aliphatic/aromatic monovalent C1-C30 hydrocarbon group.

Preferred compounds of the formula I with $R^4$=H may be:

[(C₁₁H₂₃O—(CH₂—CH₂O)₂] (EtO)₂Si(CH₂)₃SH,
[(C₁₁H₂₃O—(CK₂—CH₂O)₃] (EtO)₂Si(CH₂)₃SH,
[(C₁₁H₂₃O—(CH₂—CH₂O)₄] (EtO)₂Si(CH₂)₃SH,
[(C₁₁H₂₃O—(CH₂—CH₂O)₅] (EtO)₂Si(CH₂)₃SH,
[(C₁₁H₂₃O—(CH₂—CH₂O)₆] (EtO)₂Si(CH₂)₃SH,
[(C₁₂H₂₅O—(CH₂—CH₂O)₂] (EtO)₂Si(CH₂)₃SH,
[(C₁₂H₂₅O—(CK₂—CH₂O)₃] (EtO)₂Si(CH₂)₃SH,
[(C₁₂H₂₅O—(CH₂—CH₂O)₄] (EtO)₂Si(CH₂)₃SH,
[(C₁₂H₂₅O—(CH₂—CH₂O)₅] (EtO)₂Si(CH₂)₃SH,
[(C₁₂H₂₅O—(CH₂—CH₂O)₆] (EtO)₂Si(CH₂)₃SH,
[(C₁₃H₂₇O—(CH₂—CH₂O)₂] (EtO)₂Si(CH₂)₃SH,
[(C₁₃H₂₇O—(CK₂—CH₂O)₃] (EtO)₂Si(CH₂)₃SH,
[(C₁₃H₂₇O—(CH₂—CH₂O)₄] (EtO)₂Si(CH₂)₃SH,
[(C₁₃H₂₇O—(CH₂—CH₂O)₅] (EtO)₂Si(CH₂)₃SH,
[(C₁₃H₂₇O—(CH₂—CH₂O)₆] (EtO)₂Si(CH₂)₃SH,
[(C₁₄H₂₉O—(CH₂—CH₂O)₂] (EtO)₂Si(CH₂)₃SH,
[(C₁₄H₂₉O—(CK₂—CH₂O)₃] (EtO)₂Si(CH₂)₃SH,
[(C₁₄H₂₉O—(CH₂—CH₂O)₄] (EtO)₂Si(CH₂)₃SH,
[(C₁₄H₂₉O—(CH₂—CH₂O)₅] (EtO)₂Si(CH₂)₃SH,
[(C₁₄H₂₉O—(CH₂—CH₂O)₆] (EtO)₂Si(CH₂)₃SH,
[(C₁₅H₃₁O—(CH₂—CH₂O)₂] (EtO)₂Si(CH₂)₃SH,
[(C₁₅H₃₁O—(CK₂—CH₂O)₃] (EtO)₂Si(CH₂)₃SH,
[(C₁₅H₃₁O—(CH₂—CH₂O)₄] (EtO)₂Si(CH₂)₃SH,
[(C₁₅H₃₁O—(CH₂—CH₂O)₅] (EtO)₂Si(CH₂)₃SH,
[(C₁₅H₃₁O—(CH₂—CH₂O)₆] (EtO)₂Si(CH₂)₃SH,
[(C₁₆H₃₃O—(CH₂—CH₂O)₂] (EtO)₂Si(CH₂)₃SH,
[(C₁₆H₃₃O—(CK₂—CH₂O)₃] (EtO)₂Si(CH₂)₃SH,
[(C₁₆H₃₃O—(CH₂—CH₂O)₄] (EtO)₂Si(CH₂)₃SH,
[(C₁₆H₃₃O—(CH₂—CH₂O)₅] (EtO)₂Si(CH₂)₃SH,
[(C₁₆H₃₃O—(CH₂—CH₂O)₆] (EtO)₂Si(CH₂)₃SH,
[(C₁₇H₃₅O—(CH₂—CH₂O)₂] (EtO)₂Si(CH₂)₃SH,
[(C₁₇H₃₅O—(CK₂—CH₂O)₃] (EtO)₂Si(CH₂)₃SH,
[(C₁₇H₃₅O—(CH₂—CH₂O)₄] (EtO)₂Si(CH₂)₃SH,
[(C₁₇H₃₅O—(CH₂—CH₂O)₅] (EtO)₂Si(CH₂)₃SH,
[(C₁₇H₃₅O—(CH₂—CH₂O)₆] (EtO)₂Si(CH₂)₃SH,
[(C₁₁H₂₃O—(CH₂—CH₂O)₂]₂(EtO)Si(CH₂)₃SH,
[(C₁₁H₂₃O—(CK₂—CH₂O)₃]₂(EtO)Si(CH₂)₃SH,
[(C₁₁H₂₃O—(CH₂—CH₂O)₄]₂(EtO)Si(CH₂)₃SH,
[(C₁₁H₂₃O—(CH₂—CH₂O)₅]₂(EtO)Si(CH₂)₃SH,
[(C₁₁H₂₃O—(CH₂—CH₂O)₆]₂(EtO)Si(CH₂)₃SH,
[(C₁₂H₂₅O—(CH₂—CH₂O)₂]₂(EtO)Si(CH₂)₃SH,
[(C₁₂H₂₅O—(CK₂—CH₂O)₃]₂(EtO)Si(CH₂)₃SH,
[(C₁₂H₂₅O—(CH₂—CH₂O)₄]₂(EtO)Si(CH₂)₃SH,
[(C₁₂H₂₅O—(CH₂—CH₂O)₅]₂(EtO)Si(CH₂)₃SH,
[(C₁₂H₂₅O—(CH₂—CH₂O)₆]₂(EtO)Si(CH₂)₃SH,
[(C₁₃H₂₇O—(CH₂—CH₂O)₂]₂(EtO)Si(CH₂)₃SH,
[(C₁₃H₂₇O—(CK₂—CH₂O)₃]₂(EtO)Si(CH₂)₃SH,
[(C₁₃H₂₇O—(CH₂—CH₂O)₄]₂(EtO)Si(CH₂)₃SH,
[(C₁₃H₂₇O—(CH₂—CH₂O)₅]₂(EtO)Si(CH₂)₃SH,
[(C₁₃H₂₇O—(CH₂—CH₂O)₆]₂(EtO)Si(CH₂)₃SH,
[(C₁₄H₂₉O—(CH₂—CH₂O)₂]₂(EtO)Si(CH₂)₃SH,
[(C₁₄H₂₉O—(CK₂—CH₂O)₃]₂(EtO)Si(CH₂)₃SH,
[(C₁₄H₂₉O—(CH₂—CH₂O)₄]₂(EtO)Si(CH₂)₃SH,
[(C₁₄H₂₉O—(CH₂—CH₂O)₅]₂(EtO)Si(CH₂)₃SH,
[(C₁₄H₂₉O—(CH₂—CH₂O)₆]₂(EtO)Si(CH₂)₃SH,
[(C₁₅H₃₁O—(CH₂—CH₂O)₂]₂(EtO)Si(CH₂)₃SH,
[(C₁₅H₃₁O—(CK₂—CH₂O)₃]₂(EtO)Si(CH₂)₃SH,
[(C₁₅H₃₁O—(CH₂—CH₂O)₄]₂(EtO)Si(CH₂)₃SH,
[(C₁₅H₃₁O—(CH₂—CH₂O)₅]₂(EtO)Si(CH₂)₃SH,
[(C₁₅H₃₁O—(CH₂—CH₂O)₆]₂(EtO)Si(CH₂)₃SH,
[(C₁₆H₃₃O—(CH₂—CH₂O)₂]₂(EtO)Si(CH₂)₃SH,
[(C₁₆H₃₃O—(CK₂—CH₂O)₃]₂(EtO)Si(CH₂)₃SH,
[(C₁₆H₃₃O—(CH₂—CH₂O)₄]₂(EtO)Si(CH₂)₃SH,
[(C₁₆H₃₃O—(CH₂—CH₂O)₅]₂(EtO)Si(CH₂)₃SH,
[(C₁₆H₃₃O—(CH₂—CH₂O)₆]₂(EtO)Si(CH₂)₃SH,
[(C₁₇H₃₅O—(CH₂—CH₂O)₂]₂(EtO)Si(CH₂)₃SH,
[(C₁₇H₃₅O—(CK₂—CH₂O)₃]₂(EtO)Si(CH₂)₃SH,
[(C₁₇H₃₅O—(CH₂—CH₂O)₄]₂(EtO)Si(CH₂)₃SH,
[(C₁₇H₃₅O—(CH₂—CH₂O)₅]₂(EtO)Si(CH₂)₃SH,
[(C₁₇H₃₅O—(CH₂—CH₂O)₆]₂(EtO)Si(CH₂)₃SH,
[(C₁₁H₂₃O—(CH₂—CH₂O)₂]₃Si(CH₂)₃SH,
[(C₁₁H₂₃O—(CK₂—CH₂O)₃]₃Si(CH₂)₃SH,
[(C₁₁H₂₃O—(CH₂—CH₂O)₄]₃Si(CH₂)₃SH,
[(C₁₁H₂₃O—(CH₂—CH₂O)₅]₃Si(CH₂)₃SH,
[(C₁₁H₂₃O—(CH₂—CH₂O)₆]₃Si(CH₂)₃SH,
[(C₁₂H₂₅O—(CH₂—CH₂O)₂]₃Si(CH₂)₃SH,
[(C₁₂H₂₅O—(CK₂—CH₂O)₃]₃Si(CH₂)₃SH,
[(C₁₂H₂₅O—(CH₂—CH₂O)₄]₃Si(CH₂)₃SH,
[(C₁₂H₂₅O—(CH₂—CH₂O)₅]₃Si(CH₂)₃SH,
[(C₁₂H₂₅O—(CH₂—CH₂O)₆]₃Si(CH₂)₃SH,
[(C₁₃H₂₇O—(CH₂—CH₂O)₂]₃Si(CH₂)₃SH,
[(C₁₃H₂₇O—(CK₂—CH₂O)₃]₃Si(CH₂)₃SH,
[(C₁₃H₂₇O—(CH₂—CH₂O)₄]₃Si(CH₂)₃SH,
[(C₁₃H₂₇O—(CH₂—CH₂O)₅]₃Si(CH₂)₃SH,
[(C₁₃H₂₇O—(CH₂—CH₂O)₆]₃Si(CH₂)₃SH,
[(C₁₄H₂₉O—(CH₂—CH₂O)₂]₃Si(CH₂)₃SH,
[(C₁₄H₂₉O—(CK₂—CH₂O)₃]₃Si(CH₂)₃SH,
[(C₁₄H₂₉O—(CH₂—CH₂O)₄]₃Si(CH₂)₃SH,
[(C₁₄H₂₉O—(CH₂—CH₂O)₅]₃Si(CH₂)₃SH,
[(C₁₄H₂₉O—(CH₂—CH₂O)₆]₃Si(CH₂)₃SH,
[(C₁₅H₃₁O—(CH₂—CH₂O)₂]₃Si(CH₂)₃SH, $[(C_{15}H_{31}-(CH_2-CH_2O)_3]_3Si(CH_2)_3SH$,
$[(C_{15}H_{31}O-(CH_2-CH_2O)_4]_3Si(CH_2)_3SH$,
$[(C_{15}H_{31}O-(CH_2-CH_2O)_5]_3Si(CH_2)_3SH$,
$[(C_{15}H_{31}O-(CH_2-CH_2O)_6]_3Si(CH_2)_3SH$,
$[(C_{16}H_{33}O-(CH_2-CH_2O)_2]_3Si(CH_2)_3SH$,
$[(C_{16}H_{33}-(CH_2-CH_2O)_3]_3Si(CH_2)_3SH$,
$[(C_{16}H_{33}O-(CH_2-CH_2O)_4]_3Si(CH_2)_3SH$,
$[(C_{16}H_{33}O-(CH_2-CH_2O)_5]_3Si(CH_2)_3SH$,
$[(C_{16}H_{33}O-(CH_2-CH_2O)_6]_3Si(CH_2)_3SH$,
$[(C_{17}H_{35}O-(CH_2-CH_2O)_2]_3Si(CH_2)_3SH$,
$[(C_{17}H_{35}-(CH_2-CH_2O)_3]_3Si(CH_2)_3SH$,
$[(C_{17}H_{35}O-(CH_2-CH_2O)_4]_3Si(CH_2)_3SH$,
$[(C_{17}H_{35}O-(CH_2-CH_2O)_5]_3Si(CH_2)_3SH$,
$[(C_{17}H_{35}O-(CH_2-CH_2O)_6]_3Si(CH_2)_3SH$,
$[(C_{11}H_{23}O-(CH_2-CH_2O)_2](EtO)_2Si-CH_2-CH(CH_3)-CH_2-SH$,
$[(C_{11}H_{23}O-(CH_2-CH_2O)_3](EtO)_2Si-CH_2-CH(CH_3)-CH_2-SH$,
$[(C_{11}H_{23}O-(CH_2-CH_2O)_4](EtO)_2Si-CH_2-CH(CH_3)-CH_2-SH$,
$[(C_{11}H_{23}O-(CH_2-CH_2O)_5](EtO)_2Si-CH_2-CH(CH_3)-CH_2-SH$,
$[(C_{11}H_{23}O-(CH_2-CH_2O)_6](EtO)_2Si-CH_2-CH(CH_3)-CH_2-SH$,
$[(C_{12}H_{25}O-(CH_2-CH_2O)_2](EtO)_2Si-CH_2-CH(CH_3)-CH_2-SH$,
$[(C_{12}H_{25}O-(CH_2-CH_2O)_3](EtO)_2Si-CH_2-CH(CH_3)-CH_2-SH$,
$[(C_{12}H_{25}O-(CH_2-CH_2O)_4](EtO)_2Si-CH_2-CH(CH_3)-CH_2-SH$,
$[(C_{12}H_{25}O-(CH_2-CH_2O)_5](EtO)_2Si-CH_2-CH(CH_3)-CH_2-SH$,
$[(C_{12}H_{25}O-(CH_2-CH_2O)_6](EtO)_2Si-CH_2-CH(CH_3)-CH_2-SH$,
$[(C_{13}H_{27}O-(CH_2-CH_2O)_2](EtO)_2Si-CH_2-CH(CH_3)-CH_2-SH$,
$[(C_{13}H_{27}O-(CH_2-CH_2O)_3](EtO)_2Si-CH_2-CH(CH_3)-CH_2-SH$,
$[(C_{13}H_{27}O-(CH_2-CH_2O)_4](EtO)_2Si-CH_2-CH(CH_3)-CH_2-SH$,
$[(C_{13}H_{27}O-(CH_2-CH_2O)_5](EtO)_2Si-CH_2-CH(CH_3)-CH_2-SH$,
$[(C_{13}H_{27}O-(CH_2-CH_2O)_6](EtO)_2Si-CH_2-CH(CH_3)-CH_2-SH$,
$[(C_{14}H_{29}O-(CH_2-CH_2O)_2](EtO)_2Si-CH_2-CH(CH_3)-CH_2-SH$,
$[(C_{14}H_{29}O-(CH_2-CH_2O)_3](EtO)_2Si-CH_2-CH(CH_3)-CH_2-SH$,
$[(C_{14}H_{29}O-(CH_2-CH_2O)_4](EtO)_2Si-CH_2-CH(CH_3)-CH_2-SH$,
$[(C_{14}H_{29}O-(CH_2-CH_2O)_5](EtO)_2Si-CH_2-CH(CH_3)-CH_2-SH$,
$[(C_{14}H_{29}O-(CH_2-CH_2O)_6](EtO)_2Si-CH_2-CH(CH_3)-CH_2-SH$,
$[(C_{15}H_{31}O-(CH_2-CH_2O)_2](EtO)_2Si-CH_2-CH(CH_3)-CH_2-SH$,
$[(C_{15}H_{31}O-(CH_2-CH_2O)_3](EtO)_2Si-CH_2-CH(CH_3)-CH_2-SH$,
$[(C_{15}H_{31}O-(CH_2-CH_2O)_4](EtO)_2Si-CH_2-CH(CH_3)-CH_2-SH$,
$[(C_{15}H_{31}O-(CH_2-CH_2O)_5](EtO)_2Si-CH_2-CH(CH_3)-CH_2-SH$,
$[(C_{15}H_{31}O-(CH_2-CH_2O)_6](EtO)_2Si-CH_2-CH(CH_3)-CH_2-SH$,
$[(C_{16}H_{33}O-(CH_2-CH_2O)_2](EtO)_2Si-CH_2-CH(CH_3)-CH_2-SH$,
$[(C_{16}H_{33}O-(CH_2-CH_2O)_3](EtO)_2Si-CH_2-CH(CH_3)-CH_2-SH$,
$[(C_{16}H_{33}O-(CH_2-CH_2O)_4](EtO)_2Si-CH_2-CH(CH_3)-CH_2-SH$,
$[(C_{16}H_{33}O-(CH_2-CH_2O)_5](EtO)_2Si-CH_2-CH(CH_3)-CH_2-SH$,
$[(C_{16}H_{33}O-(CH_2-CH_2O)_6](EtO)_2Si-CH_2-CH(CH_3)-CH_2-SH$,
$[(C_{17}H_{35}O-(CH_2-CH_2O)_2](EtO)_2Si-CH_2-CH(CH_3)-CH_2-SH$,
$[(C_{17}H_{35}O-(CH_2-CH_2O)_3](EtO)_2Si-CH_2-CH(CH_3)-CH_2-SH$,
$[(C_{17}H_{35}O-(CH_2-CH_2O)_4](EtO)_2Si-CH_2-CH(CH_3)-CH_2-SH$,
$[(C_{17}H_{35}O-(CH_2-CH_2O)_5](EtO)_2Si-CH_2-CH(CH_3)-CH_2-SH$,
$[(C_{17}H_{35}O-(CH_2-CH_2O)_6](EtO)_2Si-CH_2-CH(CH_3)-CH_2-SH$,
$[(C_{11}H_{23}O-(CH_2-CH_2O)_2]_2(EtO)Si-CH_2-CH(CH_3)-CH_2-SH$,
$[(C_{11}H_{23}O-(CH_2-CH_2O)_3]_2(EtO)Si-CH_2-CH(CH_3)-CH_2-SH$,
$[(C_{11}H_{23}O-(CH_2-CH_2O)_4]_2(EtO)Si-CH_2-CH(CH_3)-CH_2-SH$,
$[(C_{11}H_{23}O-(CH_2-CH_2O)_5]_2(EtO)Si-CH_2-CH(CH_3)-CH_2-SH$,
$[(C_{11}H_{23}O-(CH_2-CH_2O)_6]_2(EtO)Si-CH_2-CH(CH_3)-CH_2-SH$,
$[(C_{12}H_{25}O-(CH_2-CH_2O)_2]_2(EtO)Si-CH_2-CH(CH_3)-CH_2-SH$,
$[(C_{12}H_{25}O-(CH_2-CH_2O)_3]_2(EtO)Si-CH_2-CH(CH_3)-CH_2-SH$,
$[(C_{12}H_{25}O-(CH_2-CH_2O)_4]_2(EtO)Si-CH_2-CH(CH_3)-CH_2-SH$,
$[(C_{12}H_{25}O-(CH_2-CH_2O)_5]_2(EtO)Si-CH_2-CH(CH_3)-CH_2-SH$,
$[(C_{12}H_{25}O-(CH_2-CH_2O)_6]_2(EtO)Si-CH_2-CH(CH_3)-CH_2-SH$,
$[(C_{13}H_{27}O-(CH_2-CH_2O)_2]_2(EtO)Si-CH_2-CH(CH_3)-CH_2-SH$,
$[(C_{13}H_{27}O-(CH_2-CH_2O)_3]_2(EtO)Si-CH_2-CH(CH_3)-CH_2-SH$,
$[(C_{13}H_{27}O-(CH_2-CH_2O)_4]_2(EtO)Si-CH_2-CH(CH_3)-CH_2-SH$,
$[(C_{13}H_{27}O-(CH_2-CH_2O)_5]_2(EtO)Si-CH_2-CH(CH_3)-CH_2-SH$,
$[(C_{13}H_{27}O-(CH_2-CH_2O)_6]_2(EtO)Si-CH_2-CH(CH_3)-CH_2-SH$,
$[(C_{14}H_{29}O-(CH_2-CH_2O)_2]_2(EtO)Si-CH_2-CH(CH_3)-CH_2-SH$,
$[(C_{14}H_{29}O-(CH_2-CH_2O)_3]_2(EtO)Si-CH_2-CH(CH_3)-CH_2-SH$,
$[(C_{14}H_{29}O-(CH_2-CH_2O)_4]_2(EtO)Si-CH_2-CH(CH_3)-CH_2-SH$,
$[(C_{14}H_{29}O-(CH_2-CH_2O)_5]_2(EtO)Si-CH_2-CH(CH_3)-CH_2-SH$,
$[(C_{14}H_{29}O-(CH_2-CH_2O)_6]_2(EtO)Si-CH_2-CH(CH_3)-CH_2-SH$,
$[(C_{15}H_{31}O-(CH_2-CH_2O)_2]_2(EtO)Si-CH_2-CH(CH_3)-CH_2-SH$,
$[(C_{15}H_{31}O-(CH_2-CH_2O)_3]_2(EtO)Si-CH_2-CH(CH_3)-CH_2-SH$,
$[(C_{15}H_{31}O-(CH_2-CH_2O)_4]_2(EtO)Si-CH_2-CH(CH_3)-CH_2-SH$,
$[(C_{15}H_{31}O-(CH_2-CH_2O)_5]_2(EtO)Si-CH_2-CH(CH_3)-CH_2-SH$,

[(C₁₅H₃₁O—(CH₂—CH₂O)₆]₂(EtO)Si—CH₂—CH(CH₃)—CH₂—SH,
[(C₁₆H₃₃O—(CH₂—CH₂O)₂]₂(EtO)Si—CH₂—CH(CH₃)—CH₂—SH,
[(C₁₆H₃₃O—(CH₂—CH₂O)₃]₂(EtO)Si—CH₂—CH(CH₃)—CH₂—SH,
[(C₁₆H₃₃O—(CH₂—CH₂O)₄]₂(EtO)Si—CH₂—CH(CH₃)—CH₂—SH,
[(C₁₆H₃₃O—(CH₂—CH₂O)₅]₂(EtO)Si—CH₂—CH(CH₃)—CH₂—SH,
[(C₁₆H₃₃O—(CH₂—CH₂O)₆]₂(EtO)Si—CH₂—CH(CH₃)—CH₂—SH,
[(C₁₇H₃₅O—(CH₂—CH₂O)₂]₂(EtO)Si—CH₂—CH(CH₃)—CH₂—SH,
[(C₁₇H₃₅O—(CH₂—CH₂O)₃]₂(EtO)Si—CH₂—CH(CH₃)—CH₂—SH,
[(C₁₇H₃₅O—(CH₂—CH₂O)₄]₂(EtO)Si—CH₂—CH(CH₃)—CH₂—SH,
[(C₁₇H₃₅O—(CH₂—CH₂O)₅]₂(EtO)Si—CH₂—CH(CH₃)—CH₂—SH,
[(C₁₇H₃₅O—(CH₂—CH₂O)₆]₂(EtO)Si—CH₂—CH(CH₃)—CH₂—SH,
[(C₁₁H₂₃O—(CH₂—CH₂O)₂]₃Si—CH₂—CH(CH₃)—CH₂—SH,
[(C₁₁H₂₃O—(CH₂—CH₂O)₃]₃Si—CH₂—CH(CH₃)—CH₂—SH,
[(C₁₁H₂₃O—(CH₂—CH₂O)₄]₃Si—CH₂—CH(CH₃)—CH₂—SH,
[(C₁₁H₂₃O—(CH₂—CH₂O)₅]₃Si—CH₂—CH(CH₃)—CH₂—SH,
[(C₁₁H₂₃O—(CH₂—CH₂O)₆]₃Si—CH₂—CH(CH₃)—CH₂—SH,
[(C₁₂H₂₅O—(CH₂—CH₂O)₂]₃Si—CH₂—CH(CH₃)—CH₂—SH,
[(C₁₂H₂₅O—(CH₂—CH₂O)₃]₃Si—CH₂—CH(CH₃)—CH₂—SH,
[(C₁₂H₂₅O—(CH₂—CH₂O)₄]₃Si—CH₂—CH(CH₃)—CH₂—SH,
[(C₁₂H₂₅O—(CH₂—CH₂O)₅]₃Si—CH₂—CH(CH₃)—CH₂—SH,
[(C₁₂H₂₅O—(CH₂—CH₂O)₆]₃Si—CH₂—CH(CH₃)—CH₂—SH,
[(C₁₃H₂₇O—(CH₂—CH₂O)₂]₃Si—CH₂—CH(CH₃)—CH₂—SH,
[(C₁₃H₂₇O—(CH₂—CH₂O)₃]₃Si—CH₂—CH(CH₃)—CH₂—SH,
[(C₁₃H₂₇O—(CH₂—CH₂O)₄]₃Si—CH₂—CH(CH₃)—CH₂—SH,
[(C₁₃H₂₇O—(CH₂—CH₂O)₅]₃Si—CH₂—CH(CH₃)—CH₂—SH,
[(C₁₃H₂₇O—(CH₂—CH₂O)₆]₃Si—CH₂—CH(CH₃)—CH₂—SH,
[(C₁₄H₂₉O—(CH₂—CH₂O)₂]₃Si—CH₂—CH(CH₃)—CH₂—SH,
[(C₁₄H₂₉O—(CH₂—CH₂O)₃]₃Si—CH₂—CH(CH₃)—CH₂—SH,
[(C₁₄H₂₉O—(CH₂—CH₂O)₄]₃Si—CH₂—CH(CH₃)—CH₂—SH,
[(C₁₄H₂₉O—(CH₂—CH₂O)₅]₃Si—CH₂—CH(CH₃)—CH₂—SH,
[(C₁₄H₂₉O—(CH₂—CH₂O)₆]₃Si—CH₂—CH(CH₃)—CH₂—SH,
[(C₁₅H₃₁O—(CH₂—CH₂O)₂]₃Si—CH₂—CH(CH₃)—CH₂—SH,
[(C₁₅H₃₁O—(CH₂—CH₂O)₃]₃Si—CH₂—CH(CH₃)—CH₂—SH,
[(C₁₅H₃₁O—(CH₂—CH₂O)₄]₃Si—CH₂—CH(CH₃)—CH₂—SH,
[(C₁₅H₃₁O—(CH₂—CH₂O)₅]₃Si—CH₂—CH(CH₃)—CH₂—SH,
[(C₁₅H₃₁O—(CH₂—CH₂O)₆]₃Si—CH₂—CH(CH₃)—CH₂—SH,
[(C₁₆H₃₃O—(CH₂—CH₂O)₂]₃Si—CH₂—CH(CH₃)—CH₂—SH,
[(C₁₆H₃₃O—(CH₂—CH₂O)₃]₃Si—CH₂—CH(CH₃)—CH₂—SH,
[(C₁₆H₃₃O—(CH₂—CH₂O)₄]₃Si—CH₂—CH(CH₃)—CH₂—SH,
[(C₁₆H₃₃O—(CH₂—CH₂O)₅]₃Si—CH₂—CH(CH₃)—CH₂—SH,
[(C₁₆H₃₃O—(CH₂—CH₂O)₆]₃Si—CH₂—CH(CH₃)—CH₂—SH,
[(C₁₇H₃₅O—(CH₂—CH₂O)₂]₃Si—CH₂—CH(CH₃)—CH₂—SH,
[(C₁₇H₃₅O—(CH₂—CH₂O)₃]₃Si—CH₂—CH(CH₃)—CH₂—SH,
[(C₁₇H₃₅O—(CH₂—CH₂O)₄]₃Si—CH₂—CH(CH₃)—CH₂—SH,
[(C₁₇H₃₅O—(CH₂—CH₂O)₅]₃Si—CH₂—CH(CH₃)—CH₂—SH, or
[(C₁₇H₃₅O—(CH₂—CH₂O)₆]₃Si—CH₂—CH(CH₃)—CH₂—SH, wherein $R^6$ may be branched or unbranched.

Preferred compounds of the formula I with $R^4$=CN may be:

[(C₁₁H₂₃O—(CH₂—CH₂O)₂](EtO)₂Si(CH₂)₃SCN,
[(C₁₁H₂₃O—(CH₂—CH₂O)₃](EtO)₂Si(CH₂)₃SCN,
[(C₁₁H₂₃O—(CH₂—CH₂O)₄](EtO)₂Si(CH₂)₃SCN,
[(C₁₁H₂₃O—(CH₂—CH₂O)₅](EtO)₂Si(CH₂)₃SCN,
[(C₁₁H₂₃O—(CH₂—CH₂O)₆](EtO)₂Si(CH₂)₃SCN,
[(C₁₂H₂₅O—(CH₂—CH₂O)₂](EtO)₂Si(CH₂)₃SCN,
[(C₁₂H₂₅O—(CH₂—CH₂O)₃](EtO)₂Si(CH₂)₃SCN,
[(C₁₂H₂₅O—(CH₂—CH₂O)₄](EtO)₂Si(CH₂)₃SCN,
[(C₁₂H₂₅O—(CH₂—CH₂O)₅](EtO)₂Si(CH₂)₃SCN,
[(C₁₂H₂₅O—(CH₂—CH₂O)₆](EtO)₂Si(CH₂)₃SCN,
[(C₁₃H₂₇O—(CH₂—CH₂O)₂](EtO)₂Si(CH₂)₃SCN,
[(C₁₃H₂₇O—(CH₂—CH₂O)₃](EtO)₂Si(CH₂)₃SCN,
[(C₁₃H₂₇O—(CH₂—CH₂O)₄](EtO)₂Si(CH₂)₃SCN,
[(C₁₃H₂₇O—(CH₂—CH₂O)₅](EtO)₂Si(CH₂)₃SCN,
[(C₁₃H₂₇O—(CH₂—CH₂O)₆](EtO)₂Si(CH₂)₃SCN,
[(C₁₄H₂₉O—(CH₂—CH₂O)₂](EtO)₂Si(CH₂)₃SCN,
[(C₁₄H₂₉O—(CH₂—CH₂O)₃](EtO)₂Si(CH₂)₃SCN,
[(C₁₄H₂₉O—(CH₂—CH₂O)₄](EtO)₂Si(CH₂)₃SCN,
[(C₁₄H₂₉O—(CH₂—CH₂O)₅](EtO)₂Si(CH₂)₃SCN,
[(C₁₄H₂₉O—(CH₂—CH₂O)₆](EtO)₂Si(CH₂)₃SCN,
[(C₁₁H₂₃O—(CH₂—CH₂O)₂]₂(EtO)Si(CH₂)₃SCN,
[(C₁₁H₂₃O—(CH₂—CH₂O)₃]₂(EtO)Si(CH₂)₃SCN,
[(C₁₁H₂₃O—(CH₂—CH₂O)₄]₂(EtO)Si(CH₂)₃SCN,
[(C₁₁H₂₃O—(CH₂—CH₂O)₅]₂(EtO)Si(CH₂)₃SCN,
[(C₁₁H₂₃O—(CH₂—CH₂O)₆]₂(EtO)Si(CH₂)₃SCN,
[(C₁₂H₂₅O—(CH₂—CH₂O)₂]₂(EtO)Si(CH₂)₃SCN,
[(C₁₂H₂₅O—(CH₂—CH₂O)₃]₂(EtO)Si(CH₂)₃SCN,
[(C₁₂H₂₅O—(CH₂—CH₂O)₄]₂(EtO)Si(CH₂)₃SCN,
[(C₁₂H₂₅O—(CH₂—CH₂O)₅]₂(EtO)Si(CH₂)₃SCN,
[(C₁₂H₂₅O—(CH₂—CH₂O)₆]₂(EtO)Si(CH₂)₃SCN,
[(C₁₃H₂₇O—(CH₂—CH₂O)₂]₂(EtO)Si(CH₂)₃SCN,
[(C₁₃H₂₇O—(CH₂—CH₂O)₃]₂(EtO)Si(CH₂)₃SCN,
[(C₁₃H₂₇O—(CH₂—CH₂O)₄]₂(EtO)Si(CH₂)₃SCN,
[(C₁₃H₂₇O—(CH₂—CH₂O)₅]₂(EtO)Si(CH₂)₃SCN,
[(C₁₃H₂₇O—(CH₂—CH₂O)₆]₂(EtO)Si(CH₂)₃SCN,
[(C₁₄H₂₉O—(CH₂—CH₂O)₂]₂(EtO)Si(CH₂)₃SCN,
[(C₁₄H₂₉O—(CH₂—CH₂O)₃]₂(EtO)Si(CH₂)₃SCN,
[(C₁₄H₂₉O—(CH₂—CH₂O)₄]₂(EtO)Si(CH₂)₃SCN,
[(C₁₄H₂₉O—(CH₂—CH₂O)₅]₂(EtO)Si(CH₂)₃SCN, $[(C_{14}H_{29}O-(CH_2-CH_2O)_6]_2(EtO)Si(CH_2)_3SCN$,
$[(C_{11}H_{23}O-(CH_2-CH_2O)_2]_3Si(CH_2)_3SCN$,
$[(C_{11}H_{23}O-(CH_2-CH_2O)_3]_3Si(CH_2)_3SCN$,
$[(C_{11}H_{23}O-(CH_2-CH_2O)_4]_3Si(CH_2)_3SCN$,
$[(C_{11}H_{23}O-(CH_2-CH_2O)_5]_3Si(CH_2)_3SCN$,
$[(C_{11}H_{23}O-(CH_2-CH_2O)_6]_3Si(CH_2)_3SCN$,
$[(C_{12}H_{25}O-(CH_2-CH_2O)_2]_3Si(CH_2)_3SCN$,
$[(C_{12}H_{25}O-(CH_2-CH_2O)_3]_3Si(CH_2)_3SCN$,
$[(C_{12}H_{25}O-(CH_2-CH_2O)_4]_3Si(CH_2)_3SCN$,
$[(C_{12}H_{25}O-(CH_2-CH_2O)_5]_3Si(CH_2)_3SCN$,
$[(C_{12}H_{25}O-(CH_2-CH_2O)_6]_3Si(CH_2)_3SCN$,
$[(C_{13}H_{27}O-(CH_2-CH_2O)_2]_3Si(CH_2)_3SCN$,
$[(C_{13}H_{27}O-(CH_2-CH_2O)_3]_3Si(CH_2)_3SCN$,
$[(C_{13}H_{27}O-(CH_2-CH_2O)_4]_3Si(CH_2)_3SCN$,
$[(C_{13}H_{27}O-(CH_2-CH_2O)_5]_3Si(CH_2)_3SCN$,
$[(C_{13}H_{27}O-(CH_2-CH_2O)_6]_3Si(CH_2)_3SCN$,
$[(C_{14}H_{29}O-(CH_2-CH_2O)_2]_3Si(CH_2)_3SCN$,
$[(C_{14}H_{29}O-(CH_2-CH_2O)_3]_3Si(CH_2)_3SCN$,
$[(C_{14}H_{29}O-(CH_2-CH_2O)_4]_3Si(CH_2)_3SCN$,
$[(C_{14}H_{29}O-(CH_2-CH_2O)_5]_3Si(CH_2)_3SCN$, or
$[(C_{14}H_{29}O-(CH_2-CH_2O)_6]_3Si(CH_2)_3SCN$, wherein $R^6$ may be branched or unbranched.

Preferred compounds of the formula I with $R^4 = -C(=O)-R^9$ and $R^9$ = branched or unbranched $-C_5H_{11}$, $-C_6H_{13}$, $-C_7H_{15}$, $-C_8H_{17}$, $-C_9H_{19}$, $-C_{10}H_{21}$, $-C_{11}H_{23}$, $-C_{12}H_{25}$, $-C_{13}H_{27}$, $-C_{14}H_{29}$, $-C_{15}H_{31}$, $-C_{16}H_{33}$, $-C_{17}H_{35}$ and $-C_6H_5$ (phenyl) may be:

$[(C_{11}H_{23}O-(CH_2-CH_2O)_2](EtO)_2Si(CH_2)_3-C(=O)-R^9$,
$[(C_{11}H_{23}O-(CH_2-CH_2O)_3](EtO)_2Si(CH_2)_3-C(=O)-R^9$,
$[(C_{11}H_{23}O-(CH_2-CH_2O)_4](EtO)_2Si(CH_2)_3-C(=O)-R^9$,
$[(C_{11}H_{23}O-(CH_2-CH_2O)_5](EtO)_2Si(CH_2)_3-C(=O)-R^9$,
$[(C_{11}H_{23}O-(CH_2-CH_2O)_6](EtO)_2Si(CH_2)_3-C(=O)-R^9$,
$[(C_{12}H_{25}O-(CH_2-CH_2O)_2](EtO)_2Si(CH_2)_3-C(=O)-R^9$,
$[(C_{12}H_{25}O-(CH_2-CH_2O)_3](EtO)_2Si(CH_2)_3-C(=O)-R^9$,
$[(C_{12}H_{25}O-(CH_2-CH_2O)_4](EtO)_2Si(CH_2)_3-C(=O)-R^9$,
$[(C_{12}H_{25}O-(CH_2-CH_2O)_5](EtO)_2Si(CH_2)_3-C(=O)-R^9$,
$[(C_{12}H_{25}O-(CH_2-CH_2O)_6](EtO)_2Si(CH_2)_3-C(=O)-R^9$,
$[(C_{13}H_{27}O-(CH_2-CH_2O)_2](EtO)_2Si(CH_2)_3-C(=O)-R^9$,
$[(C_{13}H_{27}O-(CH_2-CH_2O)_3](EtO)_2Si(CH_2)_3-C(=O)-R^9$,
$[(C_{13}H_{27}O-(CH_2-CH_2O)_4](EtO)_2Si(CH_2)_3-C(=O)-R^9$,
$[(C_{13}H_{27}O-(CH_2-CH_2O)_5](EtO)_2Si(CH_2)_3-C(=O)-R^9$,
$[(C_{13}H_{27}O-(CH_2-CH_2O)_6](EtO)_2Si(CH_2)_3-C(=O)-R^9$,
$[(C_{14}H_{29}O-(CH_2-CH_2O)_2](EtO)_2Si(CH_2)_3-C(=O)-R^9$,
$[(C_{14}H_{29}O-(CH_2-CH_2O)_3](EtO)_2Si(CH_2)_3-C(=O)-R^9$,
$[(C_{14}H_{29}O-(CH_2-CH_2O)_4](EtO)_2Si(CH_2)_3-C(=O)-R^9$,
$[(C_{14}H_{29}O-(CH_2-CH_2O)_5](EtO)_2Si(CH_2)_3-C(=O)-R^9$,
$[(C_{14}H_{29}O-(CH_2-CH_2O)_6](EtO)_2Si(CH_2)_3-C(=O)-R^9$,
$[(C_{11}H_{23}O-(CH_2-CH_2O)_2]_2(EtO)Si(CH_2)_3-C(=O)-R^9$,
$[(C_{11}H_{23}O-(CH_2-CH_2O)_3]_2(EtO)Si(CH_2)_3-C(=O)-R^9$,
$[(C_{11}H_{23}O-(CH_2-CH_2O)_4]_2(EtO)Si(CH_2)_3-C(=O)-R^9$,
$[(C_{11}H_{23}O-(CH_2-CH_2O)_5]_2(EtO)Si(CH_2)_3-C(=O)-R^9$,
$[(C_{11}H_{23}O-(CH_2-CH_2O)_6]_2(EtO)Si(CH_2)_3-C(=O)-R^9$,
$[(C_{12}H_{25}O-(CH_2-CH_2O)_2]_2(EtO)Si(CH_2)_3-C(=O)-R^9$,
$[(C_{12}H_{25}O-(CH_2-CH_2O)_3]_2(EtO)Si(CH_2)_3-C(=O)-R^9$,
$[(C_{12}H_{25}O-(CH_2-CH_2O)_4]_2(EtO)Si(CH_2)_3-C(=O)-R^9$,
$[(C_{12}H_{25}O-(CH_2-CH_2O)_5]_2(EtO)Si(CH_2)_3-C(=O)-R^9$,
$[(C_{12}H_{25}O-(CH_2-CH_2O)_6]_2(EtO)Si(CH_2)_3-C(=O)-R^9$,
$[(C_{13}H_{27}O-(CH_2-CH_2O)_2]_2(EtO)Si(CH_2)_3-C(=O)-R^9$,
$[(C_{13}H_{27}O-(CH_2-CH_2O)_3]_2(EtO)Si(CH_2)_3-C(=O)-R^9$,
$[(C_{13}H_{27}O-(CH_2-CH_2O)_4]_2(EtO)Si(CH_2)_3-C(=O)-R^9$,
$[(C_{13}H_{27}O-(CH_2-CH_2O)_5]_2(EtO)Si(CH_2)_3-C(=O)-R^9$,
$[(C_{13}H_{27}O-(CH_2-CH_2O)_6]_2(EtO)Si(CH_2)_3-C(=O)-R^9$,
$[(C_{14}H_{29}O-(CH_2-CH_2O)_2]_2(EtO)Si(CH_2)_3-C(=O)-R^9$,
$[(C_{14}H_{29}O-(CH_2-CH_2O)_3]_2(EtO)Si(CH_2)_3-C(=O)-R^9$,
$[(C_{14}H_{29}O-(CH_2-CH_2O)_4]_2(EtO)Si(CH_2)_3-C(=O)-R^9$,
$[(C_{14}H_{29}O-(CH_2-CH_2O)_5]_2(EtO)Si(CH_2)_3-C(=O)-R^9$,
$[(C_{14}H_{29}O-(CH_2-CH_2O)_6]_2(EtO)Si(CH_2)_3-C(=O)-R^9$,
$[(C_{11}H_{23}O-(CH_2-CH_2O)_2]_3Si(CH_2)_3-C(=O)-R^9$,
$[(C_{11}H_{23}O-(CH_2-CH_2O)_3]_3Si(CH_2)_3-C(=O)-R^9$,
$[(C_{11}H_{23}O-(CH_2-CH_2O)_4]_3Si(CH_2)_3-C(=O)-R^9$,
$[(C_{11}H_{23}O-(CH_2-CH_2O)_5]_3Si(CH_2)_3-C(=O)-R^9$,
$[(C_{11}H_{23}O-(CH_2-CH_2O)_6]_3Si(CH_2)_3-C(=O)-R^9$,
$[(C_{12}H_{25}O-(CH_2-CH_2O)_2]_3Si(CH_2)_3-C(=O)-R^9$,
$[(C_{12}H_{25}O-(CH_2-CH_2O)_3]_3Si(CH_2)_3-C(=O)-R^9$,
$[(C_{12}H_{25}O-(CH_2-CH_2O)_4]_3Si(CH_2)_3-C(=O)-R^9$,
$[(C_{12}H_{25}O-(CH_2-CH_2O)_5]_3Si(CH_2)_3-C(=O)-R^9$,
$[(C_{12}H_{25}O-(CH_2-CH_2O)_6]_3Si(CH_2)_3-C(=O)-R^9$,
$[(C_{13}H_{27}O-(CH_2-CH_2O)_2]_3Si(CH_2)_3-C(=O)-R^9$,
$[(C_{13}H_{27}O-(CH_2-CH_2O)_3]_3Si(CH_2)_3-C(=O)-R^9$,
$[(C_{13}H_{27}O-(CH_2-CH_2O)_4]_3Si(CH_2)_3-C(=O)-R^9$,
$[(C_{13}H_{27}O-(CH_2-CH_2O)_5]_3Si(CH_2)_3-C(=O)-R^9$,
$[(C_{13}H_{27}O-(CH_2-CH_2O)_6]_3Si(CH_2)_3-C(=O)-R^9$,
$[(C_{14}H_{29}O-(CH_2-CH_2O)_2]_3Si(CH_2)_3-C(=O)-R^9$,
$[(C_{14}H_{29}O-(CH_2-CH_2O)_3]_3Si(CH_2)_3-C(=O)-R^9$,
$[(C_{14}H_{29}O-(CH_2-CH_2O)_4]_3Si(CH_2)_3-C(=O)-R^9$,
$[(C_{14}H_{29}O-(CH_2-CH_2O)_5]_3Si(CH_2)_3-C(=O)-R^9$, or
$[(C_{14}H_{29}O-(CH_2-CH_2O)_6]_3Si(CH_2)_3-C(=O)-R^9$.

$R^6$ may preferably be $C_{12}$ to $C_{17}$, very preferably $C_{12}$ to $C_{16}$, exceptionally preferably $C_{12}$ to $C_{14}$, unsubstituted or substituted, branched or unbranched monovalent alkyl.

$R^6$ may be a $-C_{11}H_{23}$, $-C_{12}H_{25}$, $-C_{13}H_{27}$, $-C_{14}H_{29}$, $-C_{15}H_{31}$, $-C_{16}H_{33}$ or $-C_{17}H_{35}$ alkyl group.

$R^6$ may preferably be $C_{11}$ to $C_{35}$, more preferably $C_{11}$ to $C_{30}$, very preferably $C_{12}$ to $C_{30}$, exceptionally preferably $C_{13}$ to $C_{20}$, unsubstituted or substituted, branched or unbranched monovalent alkenyl.

$R^6$ may preferably be $C_{11}$ to $C_{14}$ and/or $C_{16}$ to $C_{30}$, very preferably $C_{11}$ to $C_{14}$ and/or $C_{16}$ to $C_{25}$, exceptionally preferably $C_{12}$ to $C_{14}$ and/or $C_{16}$ to $C_{20}$, unsubstituted or substituted, branched or unbranched monovalent aralkyl.

$R^6$ as alkenyl may be $C_{11}H_{21}$, $—C_{12}H_{23}$, $—C_{13}H_{25}$, $—C_{14}H_{27}$, $—C_{15}H_{29}$, $—C_{16}H_{31}$ or $—C_{17}H_{33}$.

$R^1$ may be an alkoxylated castor oil (e.g. CAS 61791-12-6).

$R^1$ may be an alkoxylated oleylamine (e.g. CAS 26635-93-8).

The polyether group $(R^5O)_m$ may comprise random ethylene and. propylene oxide units, or may comprise polyether blocks of polyethylene oxide and polypropylene oxide.

The mercaptosilane-carbon black blend may comprise a mixture of different mercaptosilanes of the general formula I.

The mixture of different mercaptosilanes of the general formula I may have a molecular weight distribution of the polyether group.

The mixture of different mercaptosilanes of the general formula I may comprise different mercaptosilanes of the general formula I wherein $R^6$ consists of different C atom chain lengths and. has a molecular weight distribution.

The mixture of different mercaptosilanes of the general formula I may comprise different mercaptosilanes of the general formula I with $R^4$ being —CN or condensation products thereof.

The mixture of different mercaptosilanes of the general formula I may comprise different mercaptosilanes of the general formula I with $R^4$ being (C=O)—$R^9$ or condensation products thereof.

The polyether group $(R^5—O)_m$ may preferably be:
$(—O—CH_2—CH_2—)_a$,
$(—O—CH(CH_3)—CH_2—)_a$,
$(—O—CH_2—CH(CH_3)—)_a$,
$(—O—CH_2—CH_2—)_a(—O—CH(CH_3)—CH_2—)$,
$(—O—CH_2—CH_2—)(—O—CH(CH_3)—CH_2—)_a$,
$(—O—CH_2—CH_2—)_a(—O—CH_2—CH(CH_3)—)$,
$(—O—CH_2—CH_2—)(—O—CH_2—CH(CH_3)—)_a$,
$(—O—CH(CH_3)—CH_2—)_a(—O—CH_2—CH(CH_3)—)$,
$(—O—CH(CH_3)—CH_2—)(—O—CH_2—CH(CH_3)—)_a$,
$(—O—CH_2—CH_2—)_a(—O—CH(CH_3)—CH_2—)_b(—O—CH_2—CH(CH_3)—)_c$ or combination with one another,
where a, b and c are independent of one another and
a is 1-50, preferably 2-30, more preferably 3-20, very preferably 4-15, exceptionally preferably 5-12,
b is 1-50, preferably 2-30, more preferably 3-20, very preferably 4-15, exceptionally preferably 5-12, and
c is 1-50, preferably 2-30, more preferably 3-20, very preferably 4-15, exceptionally preferably 5-12.

The indices a, b and c are integers and denote the number of repeating units.

For $R^4$ as —H, —CN or —C(=O)—$R^9$, the group $(R^5—O)_m$ may preferably comprise ethylene oxide units $(CH_2—CH_2—O)_a$ or propylene oxide units $(CH(CH_3)—CH_2—O)_a$ and/or $(CH_2—CH(CH_3)—O)_a$.

For $R^4$ as —H, —CN or —C(=O)—$R^9$, the group $(R^5—O)_m$ may preferably comprise ethylene oxide units $(CH_2—CH_2—O)_a$ and propylene oxide units $(CH(CH_3)—CH_2—O)_a$ and/or $(CH_2—CH(CH_3)—O)_a$, randomly distributed or in blocks.

For $R^4$ as —H, the alkyl polyether group $(R^5—O)_m$ may preferably comprise ethylene oxide units $(CH_2—CH_2—O)_a$ and propylene oxide units $(CH(CH_3)—CH_2—O)_a$ and/or $(CH_2—CH(CH_3)—O)_a$, randomly distributed or in blocks.

For $R^4$ as —H, the group $(R^5—O)_m$ may preferably comprise propylene oxide units $(CH(CH_3)—CH_2—O)_a$ and/or $(CH_2—CH(CH_3)—O)_a$.

For $R^4$ as —H, —CN or —C(C=O)—$R^9$, the alkyl polyether group $O—(R^5—O)_m—R^6$ may be:
$O—(CH_2—CH_2O)_2—C_{11}H_{23}$, $O—(CH_2—CH_2O)_3—C_{11}H_{23}$, $O—(CH_2—CH_2O)_4—C_{11}H_{23}$, $O—(CH_2—CH_2O)_5—C_{11}H_{23}$, $O—(CH_2—CH_2O)_6—C_{11}H_{23}$, $O—(CH_2—CH_2O)_7—C_{11}H_{23}$,
$O—(CH(CH_3)—CH_2O)_2—C_{11}H_{23}$, $O—(CH(CH_3)—CH_2O)_3—C_{11}H_{23}$, $O—(CH(CH_3)—CH_2O)_4—C_{11}H_{23}$, $O—(CH(CH_3)—CH_2O)_5—C_{11}H_{23}$, $O—(CH(CH_3)—CH_2O)_6—C_{11}H_{23}$, $O—(CH(CH_3)—CH_2O)_7—C_{11}H_{23}$,
$O—(CH_2—CH_2O)_2—C_{12}H_{25}$, $O—(CH_2—CH_2O)_3—C_{12}H_{25}$, $O—(CH_2—CH_2O)_4—C_{12}H_{25}$, $O—(CH_2—CH_2O)_5—C_{12}H_{25}$, $O—(CH_2—CH_2O)_6—C_{12}H_{25}$, $O—(CH_2—CH_2O)_7—C_{12}H_{25}$,
$O—(CH(CH_3)—CH_2O)_2—C_{12}H_{25}$, $O—(CH(CH_3)—CH_2O)_3—C_{12}H_{25}$, $O—(CH(CH_3)—CH_2O)_4—C_{12}H_{25}$, $O—(CH(CH_3)—CH_2O)_5—C_{12}H_{25}$, $O—(CH(CH_3)—CH_2O)_6—C_{12}H_{25}$, $O—(CH(CH_3)—CH_2O)_7—C_{12}H_{25}$,
$O—(CH_2—CH_2O)_2—C_{13}H_{27}$, $O—(CH_2—CH_2O)_3—C_{13}H_{27}$, $O—(CH_2—CH_2O)_4—C_{13}H_{27}$, $O—(CH_2—CH_2O)_5—C_{13}H_{27}$, $O—(CH_2—CH_2O)_6—C_{13}H_{27}$, $O—(CH_2—CH_2O)_7—C_{13}H_{27}$,
$O—(CH(CH_3)—CH_2O)_2—C_{13}H_{27}$, $O—(CH(CH_3)—CH_2O)_3—C_{13}H_{27}$, $O—(CH(CH_3)—CH_2O)_4—C_{13}H_{27}$, $O—(CH(CH_3)—CH_2O)_5—C_{13}H_{27}$, $O—(CH(CH_3)—CH_2O)_6—C_{13}H_{27}$, $O—(CH(CH_3)—CH_2O)_7—C_{13}H_{27}$,
$O—(CH_2—CH_2O)_2—C_{14}H_{29}$, $O—(CH_2—CH_2O)_3—C_{14}H_{29}$, $O—(CH_2—CH_2O)_4—C_{14}H_{29}$, $O—(CH_2—CH_2O)_5—C_{14}H_{29}$, $O—(CH_2—CH_2O)_6—C_{14}H_{29}$, $O—(CH_2—CH_2O)_7—C_{14}H_{29}$,
$O—(CH(CH_3)—CH_2O)_2—C_{14}H_{29}$, $O—(CH(CH_3)—CH_2O)_3—C_{14}H_{29}$, $O—(CH(CH_3)—CH_2O)_4—C_{14}H_{29}$, $O—(CH(CH_3)—CH_2O)_5—C_{14}H_{29}$, $O—(CH(CH_3)—CH_2O)_6—C_{14}H_{29}$, $O—(CH(CH_3)—CH_2O)_7—C_{14}H_{29}$,
$O—(CH_2—CH_2O)_2—C_{15}H_{31}$, $O—(CH_2—CH_2O)_3—C_{15}H_{31}$, $O—(CH_2—CH_2O)_4—C_{15}H_{31}$, $O—(CH_2—CH_2O)_5—C_{15}H_{31}$, $O—(CH_2—CH_2O)_6—C_{15}H_{31}$, $O—(CH_2—CH_2O)_7—C_{15}H_{31}$,
$O—(CH(CH_3)—CH_2O)_2—C_{15}H_{31}$, $O—(CH(CH_3)—CH_2O)_3—C_{15}H_{31}$, $O—(CH(CH_3)—CH_2O)_4—C_{15}H_{31}$, $O—(CH(CH_3)—CH_2O)_5—C_{15}H_{31}$, $O—(CH(CH_3)—CH_2O)_6—C_{15}H_{31}$, $O—(CH(CH_3)—CH_2O)_7—C_{15}H_{31}$,
$O—(CH_2—CH_2O)_2—C_{16}H_{33}$, $O—(CH_2—CH_2O)_3—C_{16}H_{33}$, $O—(CH_2—CH_2O)_4—C_{16}H_{33}$, $O—(CH_2—CH_2O)_5—C_{16}H_{33}$, $O—(CH_2—CH_2O)_6—C_{16}H_{33}$, $O—(CH_2—CH_2O)_7—C_{16}H_{33}$,
$O—(CH(CH_3)—CH_2O)_2—C_{16}H_{33}$, $O—(CH(CH_3)—CH_2O)_3—C_{16}H_{33}$, $O—(CH(CH_3)—CH_2O)_4—C_{16}H_{33}$, $O—(CH(CH_3)—CH_2O)_5—C_{16}H_{33}$, $O—(CH(CH_3)—CH_2O)_6—C_{16}H_{33}$, $O—(CH(CH_3)—CH_2O)_7—C_{16}H_{33}$,
$O—(CH_2—CH_2O)_2—C_{17}H_{35}$, $O—(CH_2—CH_2O)_3—C_{17}H_{35}$, $O—(CH_2—CH_2O)_4—C_{17}H_{35}$, $O—(CH_2—CH_2O)_5—C_{17}H_{35}$, $O—(CH_2—CH_2O)_6—C_{17}H_{35}$, $O—(CH_2—CH_2O)_7—C_{17}H_{35}$,
$O—(CH(CH_3)—CH_2O)_2—C_{17}H_{35}$, $O—(CH(CH_3)—CH_2O)_3—C_{17}H_{35}$, $O—(CH(CH_3)—CH_2O)_4—C_{17}H_{35}$, $O—(CH(CH_3)—CH_2O)_5—C_{17}H_{35}$, $O—(CH(CH_3)—CH_2O)_6—C_{17}H_{35}$ or $O—(CH(CH_3)—CH_2O)_7—C_{17}H_{35}$.

The group $R^5$ may be substituted. The group $R^6$ may be $C_{13}—H_{27}$.

$R^1$ may be —$O—(C_2H_4—O)_5—C_{11}H_{23}$, —$O—(C_2H_4—O)_5—C_{12}H_{25}$, —$O—(C_2H_4—O)_5—C_{13}H_{27}$, —$O—$ $-(C_2H_4-O)_5-C_{14}H_{29}$, $-O-(C_2H_4-O)_5-C_{15}H_{31}$, $-O-(C_2H_4-O)_3-C_{13}H_{27}$, $-O-(C_2H_4-O)_4-C_{13}H_{27}$, $-O-(C_2H_4-O)_6-C_{13}H_{27}$, $-O-(C_2H_4-O)_7-C_{13}H_{27}$, $-O-(CH_2CH_2-O)_5-(CH_2)_{10}CH_3$, $-O-(CH_2CH_2-O)_5-(CH_2)_{11}CH_3$, $-O-(CH_2CH_2-O)_5-(CH_2)_{12}CH_3$, $-O-(CH_2CH_2-O)_5-(CH_2)_{13}CH_3$, $-O-(CH_2CH_2-O)_5-(CH_2)_{14}CH_3$, $-O-(CH_2CH_2-O)_3-(CH_2)_{12}CH_3$, $-O-(CH_2CH_2-O)_4-(CH_2)_{12}CH_3$, $-O-(CH_2CH_2-O)_6-(CH_2)_{12}CH_3$, $-O-(CH_2CH_2-O)_7-(CH_2)_{12}CH_3$,

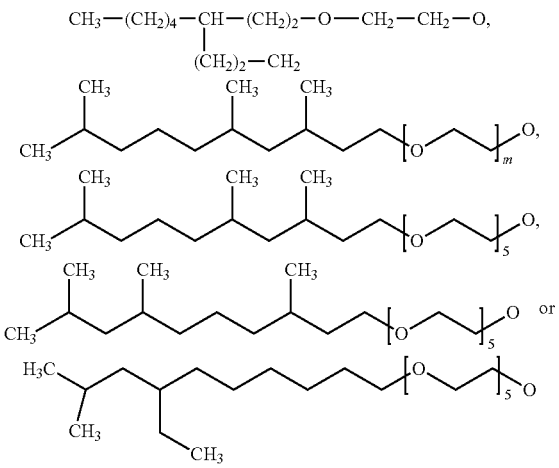

The average branching index of the carbon chain $R^6$ may be 1 to 5, preferably 1.2 to 4. This average branching index is defined as the number of $CH_3$ groups $-1$.

$R^3$ may be $CH_2$, $CH_2CH_2$, $CH_2CH_2CH_2$, $CH_2CH_2CH_2CH_2$, $CH(CH_3)$, $CH_2CH(CH_3)$, $CH(CH_3)CH_2$, $C(CH_3)_2$, $CH(C_2H_5)$, $CH_2CH_2CH(CH_3)$, $CH_2CH(CH_3)CH_2$ or

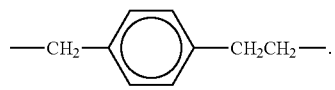

The mixture of different mercaptosilanes of the general formula I may comprise different mercaptosilanes of the general formula I having different $R^1$ and $R^2$ groups, with the $R^1$ and $R^2$ groups consisting of alkoxy and alkyl polyether groups.

The mixture of different mercaptosilanes of the general formula I may comprise different mercaptosilanes of the general formula I with different $R^2$s.

The mixture of different mercaptosilanes of the general formula I may comprise different mercaptosilanes of the general formula I with different $R^1$ and $R^2$ groups, the $R^1$ and $R^2$ groups consisting of ethoxy and alkyl polyether groups, and $R^6$ having an alkyl chain length of 13 C atoms, $R^5$ being ethylene and m being on average 5.

The mixture of different mercaptosilanes of the general formula I may comprise different mercaptosilanes of the general formula I wherein $R^2$ is identical or different at each occurrence and is an ethoxy or alkyl polyether group ($R^1$), $R^6$ an alkyl chain length of 13 C atoms, $R^5$ is ethylene and m is on average 5, and $R^2$ is different.

The mixture of different mercaptosilanes of the general formula I may comprise different mercaptosilanes of the general formula I wherein $R^1$ and $R^2$ are alkoxy and alkyl polyether groups and $R^6$ consists of different C atom chain lengths and has a molecular weight distribution.

The mixture of different mercaptosilanes of the general formula I may comprise different mercaptosilanes of the general formula I wherein $r^2$ is identical or different at each occurrence and is an alkoxy or alkyl polyether group ($R^1$) and $R^2$ in the mixture is different, $R^6$ consists of different C atom chain lengths and has a molecular weight distribution.

The mixture of different, mercaptosilanes of the general formula I may preferably comprise

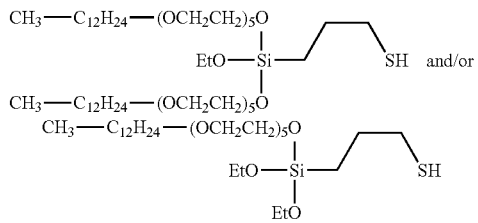

and/or hydrolysis and/or condensation products of the aforementioned compounds.

From the mercaptosilanes of the formula I it is easily possible, by adding water and optionally adding additives, to form condensation products—that is, oligosiloxanes and polysiloxanes.

These oligomeric or polymeric siloxanes of the compounds of the formula I may be used as coupling reagents for the same applications as the monomeric compounds of the formula I.

The mercaptosilane compounds may also take the form of a mixture of the oligomeric or polymeric siloxanes of mercaptosilanes of the general formula I or the form of mixtures of mercaptosilanes of the general formula I with mixtures of the oligomeric or polymeric siloxanes of mercaptosilanes of the general formula I.

The carbon black may have an STSA surface area (measured according to ASTM D 6556) of 10-150 $m^2/g$, preferably of 15-90 $m^2/g$. The carbon black may have an OAN number (measured according to ASTM D 2414) of 50-150 ml/100 g, preferably of 70-140 ml/100 g.

With particular preference the carbon black may have an STSA surface area of 20-70 $m^2/g$ and an OAK number of 100-135 ml/100 g.

The weight ratio of mercaptosilane of the general formula I to carbon black may be 30:70 to 80:20, preferably 40:60 to 70:30.

The invention further provides a method for producing the mercaptosilane-carbon black blend of the invention, the method being characterized in that at least 20 wt. %, preferably at least 25 wt. %, more preferably at least 30 wt. %, of mercaptosilanes of the general formula I, based on the mercaptosilane-carbon, black blend, are mixed with carbon black, the carbon black having an iron content of <9 ppm, very preferably of 0.1-6 ppm.

The method of the invention may be carried out continuously or discontinuously.

The mercaptosilane of the general formula I may be used in a weight ratio to carbon black of 30:70 to 80:20, preferably of 40:60 to 70:30.

The method of the invention may be carried out at. temperatures between 5 and 200° C., preferably between 10 and 100° C., more preferably between 15 and 60° C. In order to avoid condensation reactions it may be advantageous to carry out the reaction in a water-free environment, ideally in an inert gas atmosphere, The method of the invention can be carried out under atmospheric pressure or reduced pressure.

The mercaptosilane-carbon black blend of the invention may be used as an adhesion promoter between inorganic materials, for example glass fibres, metals, oxidic fillers, silicas, and organic polymers, for example thermosets, thermoplastics or elastomers, and/or as crosslinking agent and surface modifier. The mercaptosilane-carbon black blend of the invention may be used as a coupling reagent in rubber mixtures, for example tyre treads.

The invention further provides a rubber mixture comprising
(A) a rubber or mixture or rubbers,
(B) a filler, preferably precipitated silica, and
(C) at least one mercaptosilane-carbon black blend, of the invention.

Rubber used may be natural rubber and/or synthetic rubbers. Preferred synthetic rubbers are described for example in W. Hofmann, Kautschuktechnologie, Genter Verlag, Stuttgart 1980. Among others they may be
  polybutadiene (BR),
  polyisoprene (IR),
  styrene/butadiene copolymers, for example emulsion-SBR (E-SBR) or solution-SBR (S-SBR), preferably having styrene contents of 1 to 60 wt. %, more preferably 5 to 50 wt. % (SBR),
  chloroprene (CR)
  isobutylene/isoprene copolymers (IIR),
  butadiene/acrylonitrile copolymers with acrylonitrile contents of 5 to 60, preferably 10 to 50 wt. % (NBR),
  partly hydrogenated or fully hydrogenated NBR rubber (HNBR),
  ethylene/propylene/diene copolymers (EPDM),
  abovementioned rubbers additionally possessing functional groups, such as carboxyl, silanol or epoxy groups, examples being epoxidized NR, carboxy-functionalized NBR or silanol-(—SiOH) and/or siloxy-functionalized (—Si—OR) SBR,
and also mixtures of these rubbers.

In one preferred embodiment the rubbers may be sulphur-vulcanizable. For the production of car tyre treads it is possible in particular to use anionic polymerized S-SBR rubbers (solution-SBR) with a glass transition temperature of more than −50° C., and also mixtures thereof with diene rubbers. With particular preference it is possible to use S-SBR rubbers whose butadiene moieties have a vinyl fraction of more than 20 wt. %. With very particular preference it is possible to use S-SBR rubbers whose butadiene moieties have a vinyl fraction of more than 50 wt. %.

With preference it is possible to use mixtures of the aforementioned rubbers which have an S-SBR fraction of more than 50 wt. %, mere preferably more than 60 wt. %.

Fillers that may be used for the rubber mixture of the invention include the following fillers:
  Carbon blacks: the carbon blacks to be used in this context are produced by the lamp black, furnace, gas black or thermal process and possess BET surface areas of 20 to 200 m$^2$/g. The carbon blacks may optionally also contain heteroatoms such as Si, for example.
  Amorphous silicas, produced for example by precipitating solutions of silicates or by flame hydrolysis of silicon halides, having specific surface areas of 5 to 1000 m$^2$/g, preferably 20 to 400 m$^2$/g (BET surface area) and having primary particle sizes of 10 to 400 nm. The silicas may optionally also take the form of mixed oxides with other metal oxides, such as Al, Mg, Ca, Ba, Zn and titanium oxides.
  Synthetic silicates, such as aluminium silicate, alkaline earth metal silicates, such as magnesium silicate or calcium silicate, having BET surface areas of 20 to 400 m$^2$/g and primary particle diameters of 10 to 400 nm.
  Synthetic or natural aluminium oxides and aluminium hydroxides.
  Natural silicates, such as kaolin and other naturally occurring silicas.
  Glass fibres and glass fibre products (mats, strands) or glass microbeads.
  With preference it is possible to use amorphous silicas, produced by precipitating solutions of silicates, having BET surface areas of 20 to 400 m$^2$/g, more preferably 100 m$^2$/g to 250 m$^2$/g, in amounts of 5 to 150 parts by weight, based in each case on 100 parts of rubber.

The stated fillers may be used alone or in a mixture. The rubber mixture may comprise 5 to 150 parts by weight of filler (B) and 0.1 to 35 parts by weight, preferably 2 to 20 parts by weight, more preferably 5 to 15 parts by weight, of mercaptosilane-carbon black blend (C) of the invention, the parts by weight being based on 100 parts by weight of rubber.

The rubber mixture may further comprise silicone oil and/or alkylsilane.

The rubber mixture of the invention may comprise other known rubber assistants, such as, for example, crosslinkers, vulcanization accelerants, reaction accelerants, reaction retardants, ageing inhibitors, stabilizers, processing assistants, plasticizers, waxes or metal oxides, and also, optionally, activators, such as triethanolamine, polyethylene glycol or hexanetriol.

The rubber assistants may be used in customary amounts, which are guided by factors including the intended use. Customary amounts may be, for example, amounts of 0.1 to 50 wt. %, based on rubber.

Crosslinkers which can be used include sulphur or organic sulphur donors.

The rubber mixture of the invention may comprise further vulcanization accelerants. Suitable vulcanization accelerants that may be used include, for example, mercaptobenzothiazoles, sulphenamides, guanidines, dithiocarbamates, thioureas, thiocarbonates, and also zinc salts thereof, such as zinc dibutyldithiocarbamate, for example.

The rubber mixture of the invention may preferably further comprise
(D) a thiuram sulphide and/or carbamate accelerant and/or the corresponding zinc salts,
(E) a nitrogen-containing co-activator,
(F) optionally further rubber assistants and
(G) optionally further accelerants,
the weight ratio of accelerant(s) (D) to nitrogen-containing co-activator (E) being greater than or equal to 1.

The rubber mixture of the invention may comprise (D) tetrabenzylthiuram disulphide or tetramethylthiuram disulphide at not less than 0.25 part by weight, based on 100 parts by weight of rubber, (E) diphenylguanidine at not more than 0.25 part by weight, based on 100 parts by weight of rubber, and (G) cyclohexyl or dicyclohexyl sulphenamide, with more parts by weight than (D).

With preference it is possible to use sulphenamides together with guanidines and thiurams, more preferably cyclohexyl sulphenamide or dicyclohexyl sulphenamide together with diphenylguanidine and tetrabenzylthiuram disulphide or tetramethylthiuram disulphide.

The vulcanization accelerants and sulphur can be used in amounts of 0.1 to 10 wt. %, preferably 0.1 to 5 wt. %, based on the rubber used. With particular preference it is possible to use sulphur and sulphenamides in amounts of 1 to 4 wt. %, thiurams in amounts of 0.2 to 1 wt. % and guanidines in amounts from 0 wt. % to 0.5 wt. %.

The invention further provides a method for producing the rubber mixture of the invention, this method being characterized in that the rubber or mixture of rubbers (A), the filler (B), at least one mercaptosilane-carbon black blend (C) of the invention and optionally further rubber assistants are mixed in a mixing assembly.

The blending of the rubbers with the filler, optionally rubber assistants, and the mercaptosilanes of the invention may be carried our in customary mixing assemblies, such as rolls, internal mixers and mixing extruders. Such rubber mixtures can typically be produced in internal mixers, in which case first of all, in one or more successive thermomechanical mixing stages, the rubbers, the filler, the mercaptosilanes of the invention and. the rubber assistants are incorporated by mixing at 100 to 170° C. The sequence of this addition and the time of this addition of the individual components may have decisive consequences for the mixture properties obtained. The resulting rubber mixture can usually be admixed with the crosslinking chemicals in an internal mixer or on a roll at 40 to 110° C., and processed to give what is known as the crude mixture for the subsequent, processing steps, such as shaping and vulcanization, for example.

Vulcanization of the rubber mixture of the invention may take place at temperatures of 80 to 200° C., preferably 130 to 180° C., optionally under a pressure of 10 to 200 bar.

The rubber mixture of the invention can be used for producing mouldings, as for example for producing pneumatic tyres, tyre treads, cable sheathing, hoses, drive belts, conveyor belts, roll coverings, other tyres, footwear soles, sealing elements, such as sealing rings, for example, and damping elements.

The invention additionally provides mouldings obtainable by vulcanization from the rubber mixture of the invention.

An advantage of the mercaptosilane-carbon black blends of the invention is that even in the case of a prolonged storage time, the mercaptosilane does not alter to the degree observed with the known mercapto/filler blends.

EXAMPLES

Determination of Iron Content in Mercaptosilane-carbon Black Blend

Total Iron Assay After High-pressure Ashing Using ICP-MS:

Approximately 200-300 mg of the mercaptosilane-carbon black blend, are weighed out to an accuracy of 0.1 mg into a vessel made of vitreous silica.

10 ml of HNO3 (approximately 65 wt. %, super-pure) are added and the sample is digested completely in a pressure vessel at a temperature from at least 280° C. to not more than 500° C.

Thereafter the digestion product is made up to 50 ml with water (ultra-pure) and transferred to a volumetric flask (plastic).

Digestion takes place with a duplicate determination.

Prior to each digestion, 1 ml is introduced into a test-tube and made up to 10 ml with water (ultra-pure).

Each solution is subjected to measurement in an inductively coupled plasma mass spectrometer (ICP-MS) with a calibration.

For the calibration, four reference solutions and one blank solution are produced from a standard solution, based on an NIST reference material.

Corresponding chemical blank values are subjected to measurement together with the sample solutions. An internal standard is added at the same concentration to all of the measurement solutions.

Determination of Carbon Black by Sieve Residue

The 325 mesh sieve residue is determined in accordance with ASTM D1514, in ppm.

STSA Surface Area

The STSA is determined in accordance with ASTM D 6556.

OAN Number

The OAN is determined in accordance with ASTM D 2414.

Shelf Life, Determination by GPC:

Procedure:

The acetonitrile extracts are analyzed on a GPC column. To quantify the amounts of silane, a 1-point calibration is carried out with a pure specimen of the particular silane being assayed.

Instrument Settings:

HPLC system: HPLC pump S2100 from SFD, Autosampler SIL10-AF from Shimadzu, RI detector 7515A from ERC, Controller CBM-20A from Shimadzu analysis software Class VP5 from Shimadzu Preliminary column: MZ-gel SDplus 50 Å 5μ 50×3 mm, from MZ-Analysentechnik Analytic column: MZ-gel SDplus 50 Å 5μ 300×8 mm, from MZ-Analysentechnik Mobile phase: 100% methyl ethyl ketone (MEK)

Flow rate: 1.0 ml/min

Metering volume: 30 μl Analysis temperature: room temperature 20° C.

10 g of product are admixed with 180 ml of acetonitrile and stirred for 2 hours, then filtered, diluted 1:1 with methyl ethyl ketone, and injected.

The parameter evaluated is the peak area of the respective silane in the HPLC chromatogram of the RI detector (no GPC molar mass evaluation).

In the comparative examples, the reference carbon block used is N 330 (iron content: 16 ppm), and Purex HS 45 (iron content: 6 ppm) is used in the inventive examples (both commercial products from Orion Engineered Carbons). The mercaptosilane of the formula I that is used is Si 363 ((R*O)$_3$Si(CH$_2$)$_3$SH with R*=C$_{13}$H$_{27}$(OC$_2$H$_4$)$_n$ and C$_2$H$_5$, average C$_2$H$_5$ content=33%, average number n=5) from Evonik Industries.

Example 1

A Henschel mixer is charged with 1 kg of carbon black (a: N 330, b: Purex HS 45). At a through-flow temperature of 20° C., a rotary speed of 1500 rpm and a pressure of 40 bar, in one stage with a nozzle diameter of 0.5 mm, 462 g of mercaptosilane Si 363 are added until a final mixing temperature of 62-65° C. is reached (fill level: 45%).

The shelf life is determined by storing the mercaptosilane-carbon black blends at T=20° C. and 60% atmospheric humidity for 18 days.

The measurement for the comparative mercaptosilane-carbon black blend (a: N 330/Si 363 11 ppm Fe) after storage gives 7-1 wt. % of Si 363, relative to the theoretical value. The measurement for the inventive mercaptosilane-carbon black blend (b: Purex 45/Si 363 4 ppm Fe) after storage gives 85 wt. % of Si 363, relative to the theoretical value.

Example 2

The formula used for the rubber mixtures is shown in Table 1 below. In the table, the unit phr denotes weight fractions relative to 100 parts of the crude rubber used.

TABLE 1

| Substance | Amount [phr] | Amount [phr] | Amount [phr] |
|---|---|---|---|
| 1st stage | Reference rubber mixture I "in situ" | Reference rubber mixture II, containing mercaptosilane-carbon black blend as per Example 1a | Inventive rubber mixture, containing mercaptosilane-carbon black blend as per Example 1b |
| Buna VSL 5025-1 | 96 | 96 | 96 |
| Buna CB 24 | 30 | 30 | 30 |
| Ultrasil 7000 GR | 80 | 80 | 80 |
| ZnO | 3 | 3 | 3 |
| Stearic acid | 2 | 2 | 2 |
| Naftolen ZD | 10 | 10 | 10 |
| Vulkanox 4020 | 1.5 | 1.5 | 1.5 |
| Corax N 330 | 10 | — | — |
| Protektor G 3108 | — | 1 | 1 |
| Si 363 | 10 | — | — |
| Mercaptosilane-carbon black blend | — | 20 | 20 |
| 2nd stage | | | |
| Batch stage 1 | | | |
| 3rd stage | | | |
| Batch stage 2 | | | |
| Perkacit TBzTD | 0.2 | 0.2 | 0.2 |
| Vulkacit CZ | 1.5 | 1.5 | 1.5 |
| Sulphur | 2.2 | 2.2 | 2.2 |

The polymer VSL 5025-1 is a solution polymerized SBR copolymer from Bayer AG, having a styrene content of 25 wt. % and a butadiene content of 75 wt. %. The copolymer contains 37.5 phr of oil and has a Mooney viscosity (ML 1+4/100° C.) of 50.

The polymer Buna CB 24 is a cis-1,4-polybutadiene (neodymium type) from Bayer AG, having a cis-1,4 content of at least 96% and a Mooney viscosity of 44±5.

Ultrasil 7000 GR is a readily dispersible silica from Evonik Industries AG and has a BET surface area of 170 m$^2$/g. Corax N330 is a carbon black from Orion Engineered Carbons with an STSA surface area of 76 in$^2$/g.

Naftolen ZD from Chemetall is used as aromatic oil; Vulkanox 4020 is 6PPD from Bayer AG, and Protektor G3108 is an ozone protection wax from Paramelt B.V. Vulkacit D (DPG) and Vulkacit CZ (CBS) are commercial products of Bayer AG, Perkacit TBzTD (Tetrabenzylthiuram disulphide) is a product from Flexsys N.V.

The rubber mixture is produced in three stages in an internal mixer in accordance with Table 2.

TABLE 2

| Stage 1 | |
|---|---|
| Settings | |
| Mixing assembly | Werner & Pfleiderer GK 1.5E |
| Rotary speed | 70 min$^{-1}$ |
| Ram pressure | 5.5 bar |
| Through-flow temp. | 80° C. |

TABLE 2-continued

| Mixing | |
|---|---|
| 0 to 1 min | Buna VSL 5025-1 + Buna CB 24 |
| 1 to 2 min | ½ Ultrasil 7000 GR, ZnO, stearic acid, Naftolen ZD, carbon black, silane-carbon black blend |
| 2 to 4 min | ½ Ultrasil 7000 GR, Vulkanox 4020, Protektor G3108 |
| 4 to 5 min | Mixing (changing rotary speed if necessary) at 155° C. |
| 5 min | Aerating |
| 5 to 6 min | Mixing and discharging |
| Batch temp. | 150-160° C. |
| Storage | 24 h at 20° C. |

| Stage 2 | |
|---|---|
| Settings | |
| Mixing assembly | As in stage 1 except for: |
| Rotary speed | 80 min$^{-1}$ |
| Mixing | |
| 0 to 2 min | Breakup stage 1 batch |
| 2 to 5 min | Maintain batch temperature 155° C. by speed variation |
| 5 min | Discharging |
| Batch temp. | 150-160° C. |
| Storage | 4 h at 20° C. |

| Stage 3 | |
|---|---|
| Settings | |
| Mixing assembly | As in stage 1 except for: |
| Rotary speed | 40 min$^{-1}$ |
| Through-flow temp. | 50° C. |
| Mixing | |
| 0 to 0.5 min | Stage 2 batch |
| 0.5 to 2 min | Accelerant(s) and sulphur |
| 2 min | Discharge and form milled sheet on laboratory mixing rolls (Diameter 200 mm, length 450 mm, through-flow temperature 50° C.) Homogenizing: cut in 5* left, 5* right and fold over and roll 3* with narrow roll nip (3 mm) and 3* with wide roll nip (6 mm) and then draw off a milled sheet |
| Batch temp. | <110° C. |

The general method for producing rubber mixtures and vulcanizates thereof is described in "Rubber Technology Handbook", W. Hofmann, Hanser Verlag 1994.

Technical rubber testing takes place in accordance with the test methods specified in Table 3.

TABLE 3

| Physical testing | Standard/conditions |
|---|---|
| ML 1 + 4, 100° C. (3rd stage) | DIN 53523/3, ISO 667 |
| Ring tensile test, 23° C. | DIN 53504, ISO 37 |
| Tensile strength | |
| Stress values | |
| Elongation at break | |
| Shore A hardness, 23° C. | DIN 53 505 |
| Ball rebound, 60° C. | DIN EN ISO 8307 Steel ball 19 mm, 28 g |

TABLE 3-continued

| Physical testing | Standard/conditions |
|---|---|
| DIN abrasion, 10 N force | DIN 53 516 |
| Viscoelastic properties | DIN 53 513, ISO 2856 |
| 0 and 60° C., 16 Hz, 50 N initial | |
| force and 25 N amplitude force | |
| Complex modulus E* (MPa) | |
| Loss factor tan δ (–) | |

Table 4 reports the technical rubber data for crude mixture and vulcanizate.

TABLE 4

| | | Reference rubber mixture I in situ | Reference rubber mixture II | Inventive rubber mixture containing mercapto-silane-carbon black blend as per Example 1b |
|---|---|---|---|---|
| Crude mixture results | | | | |
| ML (1 + 4) at 100° C., 3rd stage | [MU] | 64 | 107 | 64 |
| Vulcanizate results | | | | |
| Stress value 100% | [MPa] | 2 | 1.9 | 1.9 |
| Elongation at break | [%] | 290 | 305 | 315 |
| DIN abrasion | [mm³] | 73 | 81 | 77 |
| Ball rebound, 70° C. | [%] | 70.2 | 61.1 | 69.1 |
| MTS, 16 Hz, 50 N Initial force, 25 N Amplitude force | | | | |
| Loss factor tan δ, 60° C. | [–] | 0.888 | 0.134 | 0.091 |

It is found that only in the case of the inventive rubber mixture is it possible to achieve the values of the in situ mixture (reference rubber mixture I). Reference rubber mixture II, which contains a carbon black with an iron fraction greater than 9 ppm, exhibits marked disadvantages in viscosity and in the dynamic data, corresponding to a significantly poorer rolling resistance.

Example 3

The formula used for the rubber mixtures is given in Table 5 below. The unit phr denotes weight fractions relative to 100 parts of the crude rubber used.

The silane-carbon black blend X 50-S (Si 69 on N 330) used for the reference rubber mixtures is available commercially from Evonik Industries.

TABLE 5

| Substance | Amount [phr] Reference rubber mixture III | Amount [phr] Inventive rubber mixture containing mercaptosilane-carbon black blend as per Example 1b |
|---|---|---|
| 1st stage | | |
| Buna VSL 5025-1 | 96 | 96 |
| Buna CB 24 | 30 | 30 |
| Ultrasil 7000 GR | 80 | 80 |
| ZnO | 3 | 3 |
| Stearic acid | 2 | 2 |
| Naftolen ZD | 10 | 10 |
| Vulkanox 4020 | 1.5 | 1.5 |
| Protektor G 3108 | 1 | 1 |
| X 50-S | 12.8 | — |
| Silane-carbon black blend | — | 20 |
| 2nd stage | | |
| Batch stage 1 | | |
| 3rd stage | | |
| Batch stage 2 | | |
| Vulkacit D | 2 | 0 |
| Perkacit TBzTD | 0.2 | 0.5 |
| Vulkacit CZ | 1.5 | 1.5 |
| Sulphur | 1.5 | 2.2 |

The polymer VSL 5025-1 is a solution polymerized SBR copolymer from Bayer AG, having a styrene content of 25 wt. % and a butadiene content of 75 wt. %. The copolymer contains 37.5 phr of oil and has a Mooney viscosity (ML 1+4/100° C.) of 50.

The polymer Buna CB 24 is a cis-1,4-polybutadiene (neodymium type) from Bayer AG, having a cis-1,4 content of at least 96% and a Mooney viscosity of 44±5.

Ultrasil 7000 GR is a readily dispersible silica from Evonik Industries AG and has a BET surface area of 170 m²/g.

Naftolen ZD from Chemetall is used as aromatic oil; Vulkanox 4020 is 6PPD from Bayer AG, and Protektor G3108 is an ozone protection wax from Paramelt B.V. Vulkacit D (DPG) and Vulkacit CZ (CBS) are commercial products of Bayer AG. Perkacit TBzTD (Tetrabenzylthiuram disulphide) is a product from Flexsys N.V.

The rubber mixture is produced in three stages in an internal mixer in accordance with Table 2.

The general method for producing rubber mixtures and vulcanizates thereof is described in "Rubber Technology Handbook", W. Hofmann, Hanser Verlag 1994.

Technical rubber testing takes place in accordance with the test methods specified in Table 3.

Table 6 reports the technical rubber data for crude mixture and vulcanizate.

TABLE 6

| Methods (vulcanization time: 25 min at 165° C.) | | Reference rubber mixture III | Inventive rubber mixture containing mercaptosilane-carbon black blend as per Example 1b |
|---|---|---|---|
| Tensile strength | [MPa] | 13.0 | 14.7 |
| Modulus 100% | [MPa] | 2.5 | 2.2 |
| Modulus 300% | [MPa] | 12.2 | 10.6 |
| Modulus 300%/100% | [–] | 4.9 | 4.8 |
| Elongation at break | [%] | 310 | 370 |
| Shore A hardness | [SH] | 70 | 71 |
| Ball rebound, RT | [%] | 36 | 42 |
| DIN Abrasion | [mm³] | 83 | 77 |

TABLE 6-continued

| Methods (vulcanization time: 25 min at 165° C.) | | Reference rubber mixture III | Inventive rubber mixture containing mercaptosilane-carbon black blend as per Example 1b |
|---|---|---|---|
| Tear propagation resistance MTS, 16 Hz, 50 N +/- 25 N | [N/mm] | 18 | 40 |
| E*, 0° C. | [MPa] | 33.5 | 29 |
| E*, 60° C. | [MPa] | 13.0 | 13.9 |
| E″, 0° C. | [MPa] | 12.0 | 8.8 |
| E″, 60° C. | [MPa] | 1.5 | 1.2 |
| tan δ, 0° C. | [-] | 0.390 | 0.314 |
| tan δ, 60° C. | [-] | 0.112 | 0.088 |

In comparison to the reference rubber mixture III, the inventive rubber mixture comprising the mercaptosilane-carbon black blend, as per Example 1b exhibits better tensile strength, greater elongation at break, lower DIN abrasion (corresponding to reduced wear), a significantly higher tear propagation resistance, a very low tanδ at 60° C. (corresponding to a level reduced by 20% relative to the X50-S reference), which is an indicator of a significantly improved rolling resistance.

The invention claimed is:

1. Mercaptosilane-carbon black blend, comprising at least 20 wt. % of mercaptosilane of the general formula I

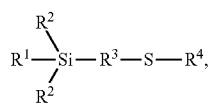

based on the mercaptosilane-carbon black blend,
wherein $R^1$ is an alkyl polyether group $-O-(R^5-O)_m-R^6$,
with $R^5$, identical or different at each occurrence, being a branched or unbranched, saturated or unsaturated, aliphatic divalent C1-C30 hydrocarbon group, m being on average 1 to 30, and $R^6$ consisting of at least 1 C atom and being an unsubstituted or substituted, branched or unbranched monovalent alkyl, alkenyl, aryl or aralkyl group,
$R^2$ is identical or different at each occurrence and is an $R^1$, C1-C12 alkyl or $R^7O$ group, with $R^7$ being H, methyl, ethyl, propyl, C9-C30 branched or unbranched monovalent alkyl, alkenyl, aryl or aralkyl group or $(R^8)_3Si$ group, with $R^8$ being C1-C30 branched or unbranched alkyl or alkenyl group,
$R^3$ is a branched or unbranched, saturated or unsaturated, aliphatic, aromatic or mixed aliphatic/aromatic divalent C1-C30 hydrocarbon group, and
$R^4$ is H, CN or (C=O)-$R^9$, with $R^9$ being a branched or unbranched, saturated or unsaturated, aliphatic, aromatic or mixed aliphatic/aromatic monovalent C1-C30 hydrocarbon group,
and carbon black,
wherein the mercaptosilane-carbon black blend has an iron content of <9 ppm.

2. Mercaptosilane-carbon black blend according to claim 1, wherein it comprises a mixture of mercaptosilanes of the general formula I.

3. Mercaptosilane-carbon black blend according to claim 1, wherein the mixture of mercaptosilanes of the general formula I comprises

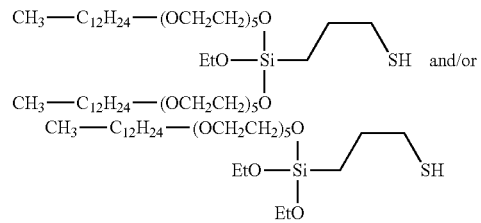

and/or hydrolysis and/or condensation products of the aforementioned compounds.

4. Method for producing mercaptosilane-carbon black blend according to claim 1, wherein at least 20 wt. % of mercaptosilane of the general formula I, based on the mercaptosilane-carbon black blend, is mixed with carbon black, the carbon black having an iron content of <9 ppm.

5. Rubber mixture wherein it comprises
(A) a rubber or mixture of rubbers,
(B) a filler and
(C) at least one mercaptosilane-carbon black blend according to claim 1.

6. Method for producing the rubber mixture containing (a) a rubber or mixture of rubbers, (b) a filler and (c) at least one mercaptosilane-carbon black blend, comprising, mixing at least one mercaptosilane-carbon black blend according to claim 1, the rubber or mixture of rubbers, the filler, optionally further rubber assistants.

7. A process for producing a shaped article comprising, providing a rubber mixture, which includes the mercaptosilane-carbon black blend according to claim 1, and moulding the mixture to form the shaped article.

8. A process according to claim 7, wherein the shaped article is pneumatic tyres, tyre treads, cable sheathing, hoses, drive belts, conveyor belts, roll coverings, tyres, footwear soles, sealing rings or damping elements.

* * * * *